United States Patent
Granata

(10) Patent No.: US 7,922,135 B2
(45) Date of Patent: Apr. 12, 2011

(54) ARTICULATING FASTENER ASSEMBLY

(76) Inventor: Robert Granata, Birmingham, MI (US)

( * ) Notice: Subject to any disclaimer, the term of this patent is extended or adjusted under 35 U.S.C. 154(b) by 0 days.

(21) Appl. No.: 11/978,343

(22) Filed: Oct. 29, 2007

(65) Prior Publication Data

US 2008/0056810 A1    Mar. 6, 2008

Related U.S. Application Data

(63) Continuation of application No. 10/894,947, filed on Jul. 20, 2004, now Pat. No. 7,435,031, which is a continuation-in-part of application No. 10/113,300, filed on Mar. 29, 2002, now Pat. No. 6,857,809.

(60) Provisional application No. 60/280,059, filed on Mar. 30, 2001.

(51) Int. Cl.
*B60J 7/00* (2006.01)

(52) U.S. Cl. ............... 248/206.5; 248/205.3; 248/309.4; 403/121; 403/137

(58) Field of Classification Search ............... 248/125.7, 248/309.1, 309.4, 316.7, 205.6; 403/121, 403/137, 83, 84, 119, 120, 166; 24/297, 24/453, 458

See application file for complete search history.

(56) References Cited

U.S. PATENT DOCUMENTS

| | | | |
|---|---|---|---|
| 2,257,979 A | 10/1941 | Rubinstein | 464/170 |
| 2,854,829 A | 10/1958 | Porter | 464/159 |
| 2,879,995 A | 3/1959 | Harrison | 472/4 |
| 2,940,361 A | 6/1960 | Francisco | 248/481 |
| 3,013,792 A | 12/1961 | Gustav | 267/161 |
| 3,367,616 A | 2/1968 | Bausch et al. | 248/483 |
| 3,900,021 A | 8/1975 | Makepeace et al. | 600/112 |
| 3,953,067 A | 4/1976 | Isola | 296/137 |
| 4,175,785 A | 11/1979 | Leiter | 296/137 |
| 4,352,522 A | 10/1982 | Miller | 296/214 |
| 4,466,655 A | 8/1984 | Baba et al. | 296/214 |
| 4,585,197 A * | 4/1986 | Liautaud et al. | 248/349.1 |
| 4,610,478 A | 9/1986 | Tervol | 296/214 |
| 4,899,975 A | 2/1990 | Suman | 248/481 |
| 4,923,244 A | 5/1990 | Clenet | 296/214 |
| 4,946,225 A | 8/1990 | Jardin | 296/213 |
| 4,981,323 A | 1/1991 | Dowd et al. | 296/214 |
| 5,082,323 A | 1/1992 | Dowd et al. | 296/214 |
| 5,186,517 A | 2/1993 | Gilmore et al. | 296/214 |
| 5,280,991 A | 1/1994 | Weiland | 296/214 |
| 5,572,773 A | 11/1996 | Bauer | 24/303 |
| 5,580,204 A | 12/1996 | Hultman | 411/509 |
| 5,622,343 A * | 4/1997 | Morton | 248/131 |

(Continued)

OTHER PUBLICATIONS

Jan. 23, 2004 "Office Action" for U.S. Appl. No. 10/113,300.

(Continued)

*Primary Examiner* — Terrell Mckinnon
*Assistant Examiner* — Steven M Marsh
(74) *Attorney, Agent, or Firm* — Bliss McGlynn, P.C.

(57) ABSTRACT

A fastener assembly securely fastens a decorative panel in spaced relation to a support backing. The fastener assembly includes a base member adapted to be operatively mounted to the decorative panel, a carrier member, and a fastening medium supported by the carrier member and adapted to operatively interconnect the carrier member to the support backing. At least one biasing member is adapted to operatively support the carrier member and provide swiveling articulation of the carrier member relative to the base member. At least one leg extends from the base member and is adapted to operatively engage the carrier member so as to attach the carrier member to the base member in articulating fashion.

17 Claims, 14 Drawing Sheets

U.S. PATENT DOCUMENTS

| | | | |
|---|---|---|---|
| 5,657,598 A | 8/1997 | Wilbs et al. | 403/122 X |
| 5,754,664 A | 5/1998 | Clark et al. | 381/86 |
| 5,755,526 A | 5/1998 | Stanevich | 403/122 |
| 5,795,015 A | 8/1998 | Corpe et al. | 296/214 |
| 5,845,458 A | 12/1998 | Patel | 52/782.1 |
| 5,850,676 A * | 12/1998 | Takahashi et al. | 24/297 |
| 5,876,084 A | 3/1999 | Smith et al. | 296/39.1 |
| 5,939,638 A | 8/1999 | Zovath et al. | 73/723 |
| 6,126,356 A | 10/2000 | Russell | 403/24 |
| 6,309,013 B1 | 10/2001 | Staltmayer et al. | 296/214 |
| 6,322,282 B1 | 11/2001 | Kussman et al. | 403/329 |
| 6,343,888 B1 | 2/2002 | Huhn et al. | 403/122 X |
| 6,477,749 B1 | 11/2002 | Reiter | 24/303 |
| 6,527,468 B1 | 3/2003 | Lindquist et al. | 403/122 |
| 6,594,870 B1 | 7/2003 | Lambrecht et al. | 24/297 |
| 6,637,082 B1 * | 10/2003 | Chang | 24/523 |
| 6,789,976 B2 * | 9/2004 | Hung et al. | 403/84 |
| 6,857,809 B2 | 2/2005 | Granata | 403/121 |
| 7,401,387 B2 * | 7/2008 | Rosemann | 24/289 |
| 2005/0253032 A1 * | 11/2005 | Pitlor | 248/206.5 |

OTHER PUBLICATIONS

Apr. 20, 2004 "Amendment" for U.S. Appl. No. 10/113,300.
Oct. 12, 2004 "Notice of Allowance" for U.S. Appl. No. 10/113,300.
Nov. 18, 2005 "Office Action" for U.S. Appl. No. 10/894,947.
Feb. 3, 2006 "Amendment" for U.S. Appl. No. 10/894,947.
May 19, 2006 "Final Office Action" for U.S. Appl. No. 10/894,947.
Jun. 15, 2006 "Amendment After Final Office Action Pursuant to 37 C.F.R. Section 1.116" for U.S. Appl. No. 10/894,947.
Nov. 20, 2006 "Office Action" for U.S. Appl. No. 10/894,947.
Feb. 15, 2007 "Amendment" for U.S. Appl. No. 10/894,947.
May 21, 2007 "Final Office Action" for U.S. Appl. No. 10/894,947.
Aug. 13, 2007 "Amendment After Final Office Action Pursuant to 37 C.F.R. Section 1.116" for U.S. Appl. No. 10/894,947.
Aug. 13, 2007 "Terminal Disclaimer to Obviate Obviousness-Type Double-Patenting Rejection" for U.S. Appl. No. 10/894,947.
Dec. 14, 2007 "Office Action" for U.S. Appl. No. 10/894,947.

* cited by examiner

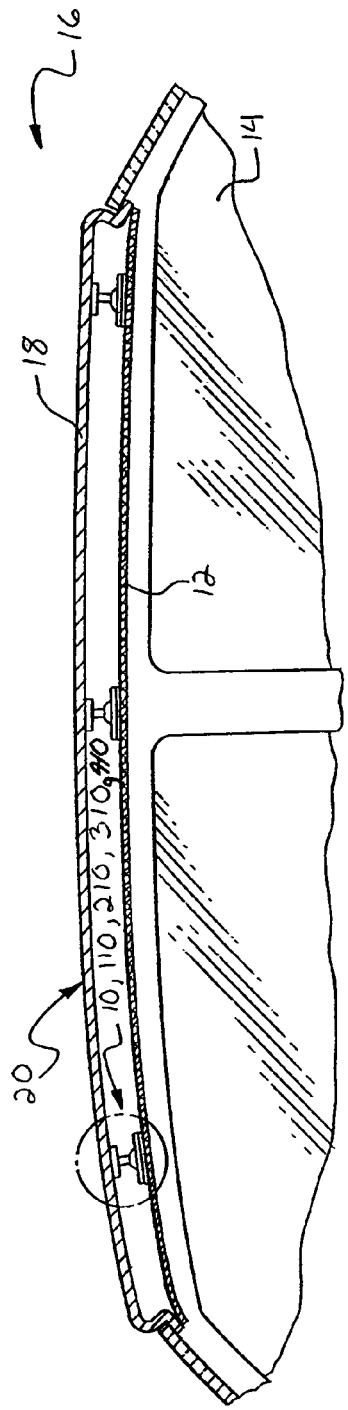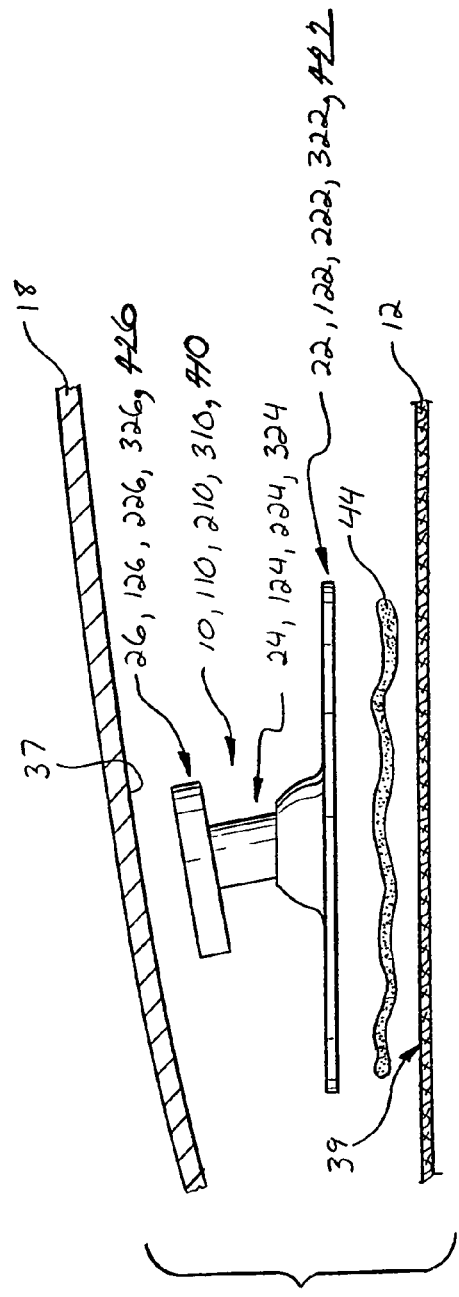

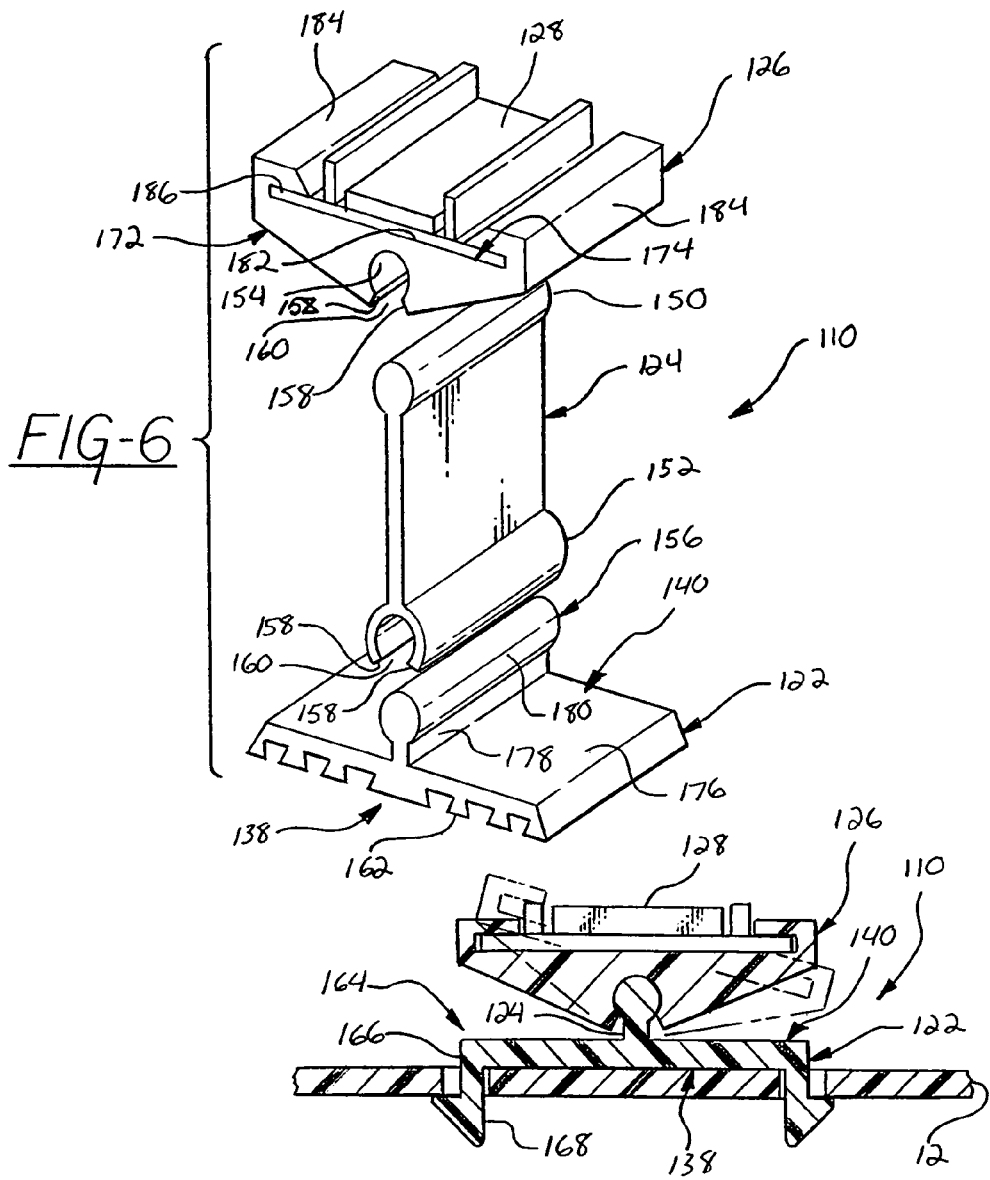
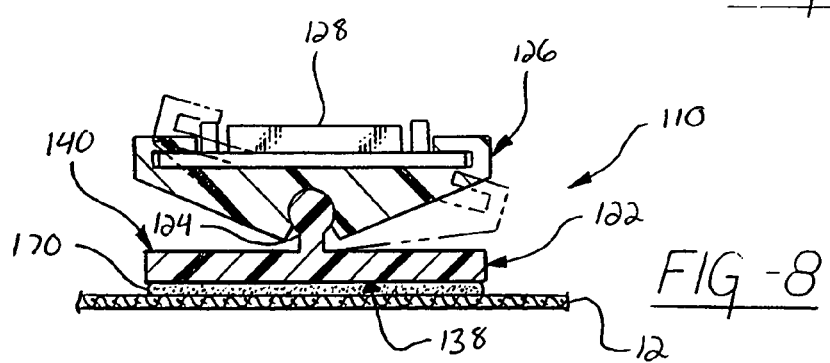

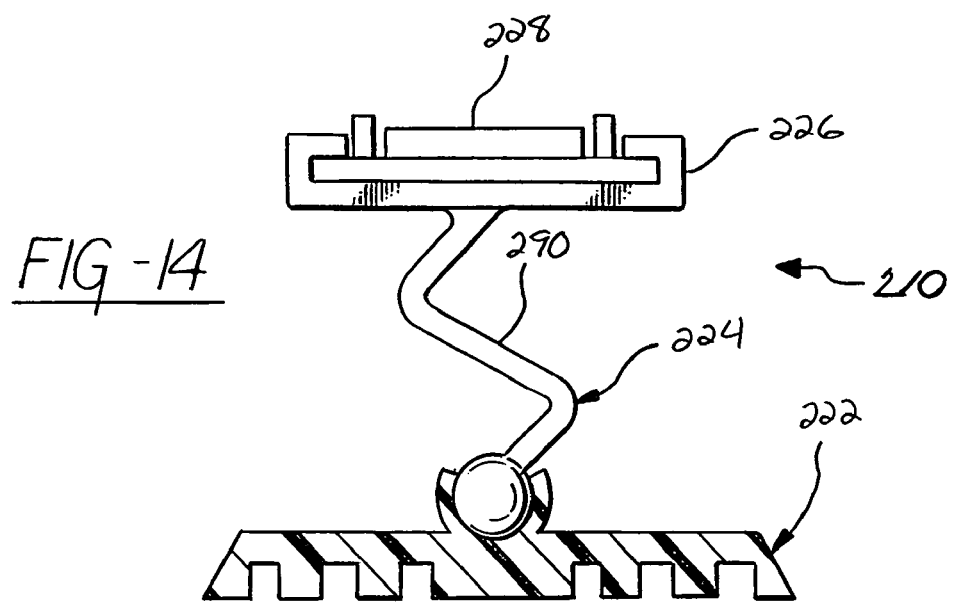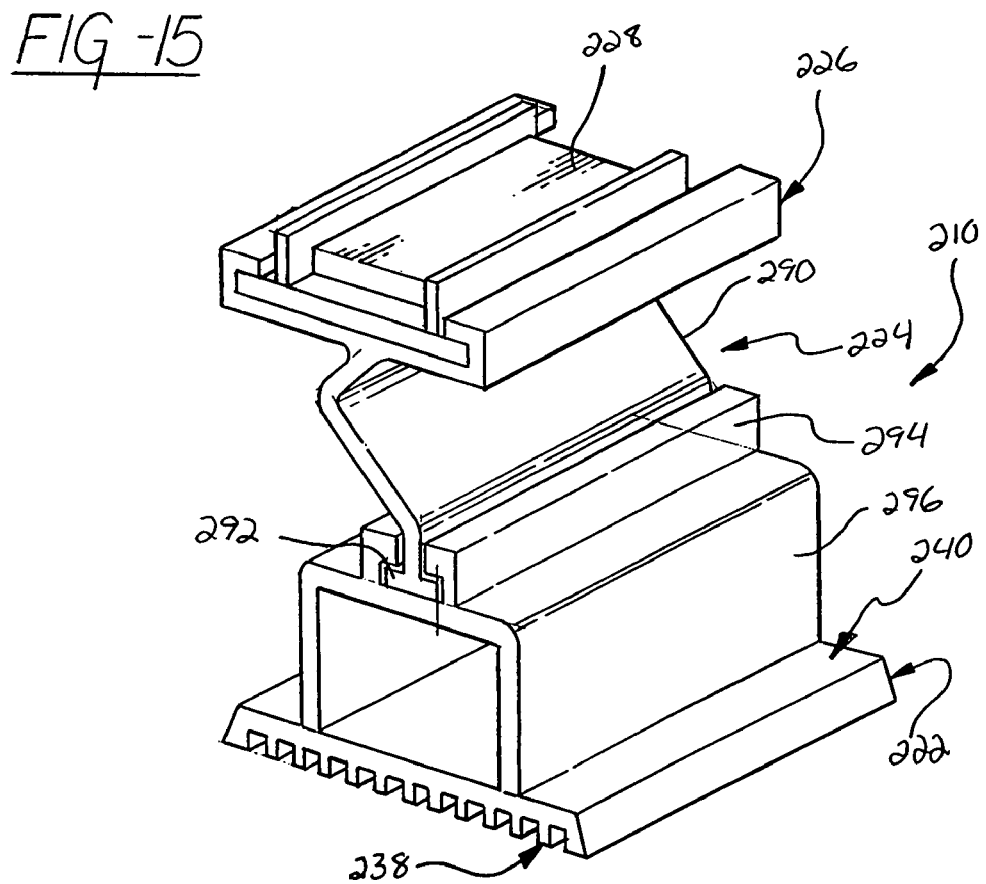

ARTICULATING FASTENER ASSEMBLY

CROSS-REFERENCE TO RELATED APPLICATIONS

This is a continuation application and claims benefit of U.S. patent application Ser. No. 10/894,947 entitled "Articulating Fastener Assembly" and filed on Jul. 20, 2004 now U.S. Pat. No. 7,435,031, which is a continuation-in-part application and claims benefit of U.S. patent application Ser. No. 10/113,300 entitled "Articulating Fastener Assembly" and filed on Mar. 29, 2002 (now U.S. Pat. No. 6,857,809), which claims benefit of U.S. Patent Application 60/280,059 entitled "Dual-Pivoting Magnet-Carrier Fastener Assembly" and filed on Mar. 30, 2001.

BACKGROUND OF THE INVENTION

1. Field of the Invention

The present invention relates, generally, to fasteners and, more particularly, to articulating, pivoting, variable-spacing fasteners.

2. Description of the Related Art

It is known in the related art to use a panel-mounting fastener assembly for attaching a decorative panel of a vehicle, such as an automobile, to an overlying or underlying sheet-metal support member. The decorative panel may include a headliner, a door panel, a seat-back panel, or another panel typically having a support backing onto which there is bonded decorative material. The decorative panel may include a resinous-impregnated fibrous-bat material for the support backing and foam-backed upholstery for the decorative material. When the decorative panel includes a headliner, the sheet-metal support member may be a roof beam extended across the roof of the vehicle for providing rigidity to the sheet-metal support member and mounting structure for the headliner.

More specifically, the headliner spans substantially the entire upper surface of the passenger compartment of the vehicle. The sheet-metal support member (sheet metal) is disposed coextensively with and adjacent the headliner opposite the passenger compartment to define substantially the entire interior surface of the roof of the vehicle body. The headliner is assembled to the vehicle body by attaching the headliner to the sheet metal via a plurality of fasteners. In the assembled state, each fastener mounts a predetermined area of the surface of the headliner to an adjacent part of the sheet metal. This predetermined area may be referred to as the "attachment area of the headliner." The adjacent part of the sheet metal that corresponds to the attachment area of the headliner may be referred to as the "attachment area of the sheet metal."

Fasteners previously used to attach the headliner to the sheet metal included screws and plastic push-pins. However, these fasteners suffered from several problems. For instance, once the screws and push-pins were installed, the heads thereof were often visible to passengers within the passenger compartment and, thus, aesthetically undesirable. Also, the screws and push-pins and the tools used to assemble them to the headliner damaged the headliner by creating holes through the headliner and stray marks on the surface of the headliner. Moreover, during assembly of the headliner, a hole formed in the sheet metal, but hidden from view, had to be "located by feel" as the assembler attempted to align the hole with the corresponding hole from the headliner. The assembler then had to insert a screw or push-pin into the hole. This effort was time-consuming and cumbersome. Furthermore, due to the extended labor and time involved in attaching/unattaching the headliner and sheet metal to/from each other using these fasteners, the cost to repair the headliner was substantial as well.

In a variant of the type of fastener just described, on the surface of the headliner was mounted an elongated holder defining a track for receiving, at any number of a plurality of spaced locations thereon, one or a plurality of mounting clips. Once secured to the holder, the mounting clip(s) allowed snap-fitting of the headliner to an aperture or respective apertures in the sheet metal. However, this fastener suffered from the same problems described in connection with screws and push-pins.

To overcome these problems, "Velcro" and other, much stronger "Dual-Lock" fasteners were used. These fasteners generally included an attaching piece that was mounted to the attachment area of the headliner. A receiving piece was similarly mounted to a corresponding area of the opposed sheet metal. The attaching and receiving pieces were respectively mounted to form a fastener between the headliner and the sheet metal. More specifically, the attaching piece of the "Velcro," for example, included an adhesive backing. The adhesive backing was used to mount the "Velcro" to the headliner or sheet metal. When positioning the headliner adjacent the sheet metal during the mounting operation, it was necessary for the respective attaching and receiving pieces to be properly aligned with each other to facilitate proper mounting of the headliner to the sheet metal.

Although these fasteners were not aesthetically undesirable and eliminated the need to "locate by feel" during installation, several problems remained unsolved. For instance, the attaching and receiving pieces of the "Velcro" or other "Dual-Lock" fastener were typically mounted on the headliner and sheet metal, respectively, prior to assembly of the headliner. Thus, proper alignment and engagement of the attaching and receiving pieces with and to each other depended upon their proper prior disposition on the headliner and sheet metal, respectively. The continuity of such alignment and engagement from vehicle to vehicle in the assembly of the headliner also depended upon the structure of the headliner and roof of the vehicle body, in general, and the appropriate surface of the sheet metal, in particular, being consistent from vehicle to vehicle. Furthermore, direct pressure had to be manually applied to the attaching piece against the receiving piece for approximately thirty seconds to ensure adherence of any adhesive backing to the receiving piece. From an ergonomics perspective, then, these fasteners were problematic. And, apart from ergonomics, the "Dual-Lock" fastener was unable to articulate and, thus, conform to the contour of the surface of the sheet metal.

To overcome these problems, use of magnets as a fastener was introduced. In one example, a relatively small, substantially rectangular magnet was supported on a foam pad mounted on a carrier. In turn, the carrier included an injection-molded base. The magnet, carrier, and base together comprised a fastener relative to the opposed sheet metal.

To assemble the headliner, many of these fasteners were strategically disposed on the appropriate surface, or substrate, of the headliner. Then, the fasteners were moved toward the sheet metal with the faces of the respective magnets substantially parallel with the sheet metal. The magnets were magnetically attracted to the sheet metal to sufficiently mount the headliner to the sheet metal. However, the roof of an automobile body is generally curved, and the carrier and base did not permit the fastener to conform to the contour of a curved sheet-metal surface.

Despite the advantages over its predecessors, this fastener still posed some problems. For example, as more and more headliners become modular, ductwork, wiring components, and other components are supported between the headliner and the sheet-metal roof of the vehicle body. These components require space between the sheet metal and the headliner. The amount of space separating the headliner and the sheet metal is a design consideration in the manufacture of the vehicle that varies from vehicle to vehicle. These variations resulted in increased tooling costs for fasteners of this type.

Accordingly, there remains a need in the related art for a fastener that articulates such that the fastener can conform to the contour of a curved sheet-metal surface, pivots such that the attachment area of the headliner can be attached to the attachment area of the sheet metal at varying angles, and accommodates a varying space presented between the headliner and the sheet metal in the assembled state of the headliner, but does not stretch under the influence of heat.

SUMMARY OF THE INVENTION

The present invention overcomes the disadvantages in the related art in a fastener assembly for securely fastening a decorative panel in spaced relation to a support backing. The fastener assembly includes a base member adapted to be operatively mounted to the decorative panel, a carrier member, and a fastening medium supported by the carrier member and adapted to operatively interconnect the carrier member to the support backing. At least one biasing member is adapted to operatively support the carrier member and provide swiveling articulation of the carrier member relative to the base member. At least one leg extends from the base member and is adapted to operatively engage the carrier member so as to attach the carrier member to the base member in articulating fashion.

One advantage of the articulating fastener assembly of the present invention is that it is not visible to passengers within the passenger compartment of a vehicle when the headliner is in the assembled state and, thereby, facilitates a vehicle headliner that is aesthetically pleasing.

Another advantage of the articulating fastener assembly of the present invention is that it does not damage the headliner during assembly and disassembly thereof.

Another advantage of the articulating fastener assembly of the present invention is that it makes assembling and disassembling the headliner less time-consuming and requires less labor to assemble and disassemble the headliner, thereby reducing manufacturing, service, and warranty costs.

Another advantage of the articulating fastener assembly of the present invention is that it articulates such that it can conform to the contour of each of the headliner and a sheet-metal vehicle roof.

Another advantage of the articulating fastener assembly of the present invention is that it pivots to accommodate the structure of a sheet-metal vehicle roof at varying angles.

Another advantage of the articulating fastener assembly of the present invention is that it accommodates varying spaces presented between the headliner and a sheet-metal vehicle roof.

Another advantage of the articulating fastener assembly of the present invention is that it does not stretch under the influence of heat.

Another advantage of the articulating fastener assembly of the present invention is that it prevents the headliner from sagging in the assembled state thereof.

Another advantage of the articulating fastener assembly of the present invention is the modularity of the base member, linking member, and carrier member.

Another advantage of the articulating fastener assembly of the present invention is use of neodymium magnets therewith, which provides significantly more strength than does use with flexible, extruded magnets.

Another advantage of the articulating fastener assembly of the present invention is that the magnet provides relatively greater surface area and, thus, efficiency of magnetic force supplied by the magnet.

Another advantage of the articulating fastener assembly of the present invention is that the magnet provides relatively greater flexibility in varying the magnetic force supplied by the magnet.

Another advantage of the articulating fastener assembly of the present invention is that it provides superior serviceability (relative to "Velcro" and other "Dual-Lock" fasteners).

Another advantage of the articulating fastener assembly of the present invention is that it provides for easier assembly of the headliner, i.e., does not require a male/female or hook-and-loop structural relationship.

Another advantage of the articulating fastener assembly of the present invention is that it does not require use of pressure-sensitive adhesives, which typically cannot hold-up to the new, higher heat requirements of 95° C.

Another advantage of the articulating fastener assembly of the present invention is that it, with the exception of the bond thereof to the headliner, is entirely mechanical and can pass all heat requirements.

Another advantage of the articulating fastener assembly of the present invention is that the base member can be designed to conform to a decorative panel having substantially any shape and contour.

Another advantage of the articulating fastener assembly of the present invention is that it can accept substantially any size fastening medium.

Another advantage of the articulating fastener assembly of the present invention is that the shape of the carrier member of the assembly allows for more surface-area contact to the support backing.

Another advantage of the articulating fastener assembly of the present invention is that the shape of the carrier member of the assembly eliminates the need for complete flatness of the carrier member.

Another advantage of the articulating fastener assembly of the present invention is that the carrier member provides precisely even surfaces, thereby reducing or eliminating rocking, buzzing, squeaking, and rattling of the assembly when mounted to a headliner.

Another advantage of the articulating fastener assembly of the present invention is that a magnetic carrier member provides improved flux circuitry and, thus, superior holding forces.

Another advantage of the articulating fastener assembly of the present invention is that a magnetic carrier member and the fastening medium can be customized to a particular holding requirement.

Another advantage of the articulating fastener assembly of the present invention is that the shape of the legs of the assembly provides structural integrity to the assembly.

Another advantage of the articulating fastener assembly of the present invention is that the fastening medium can be removably fastened to the carrier member.

Still another advantage of the articulating fastener assembly of the present invention is that the carrier member can be further attached to the base member in articulating fashion.

Other objects, features, and advantages of the present invention will be readily appreciated as the same becomes better understood while reading the subsequent description when taken in conjunction with the accompanying drawings.

BRIEF DESCRIPTION OF THE DRAWINGS

FIG. 1 is an environmental cross-sectional side view of a preferred embodiment of the articulating fastener assembly of the present invention illustrating one possible disposition of the articulating fastener assembly relative to a headliner and sheet-metal roof of a motor vehicle;

FIG. 2 is an exploded perspective view of the preferred embodiment of the articulating fastener assembly of the present invention shown in FIG. 1 illustrating the base member, linking member, and carrier member of the articulating fastener assembly in the unassembled state of the headliner;

FIG. 6 is an exploded perspective view of the preferred embodiment of the articulating fastener assembly of the present invention shown in FIG. 4 illustrating the base member, linking member, and carrier member of the articulating fastener assembly in the unassembled state thereof;

FIG. 7 is a cross-sectional side view of another preferred embodiment of the articulating fastener assembly of the present invention illustrating variability of articulation thereof and the clip legs of the articulating fastener assembly in the assembled state thereof fastened to a substrate;

FIG. 8 is a cross-sectional side view of another preferred embodiment of the articulating fastener assembly of the present invention illustrating variability of articulation thereof and use of adhesive to mount the articulating fastener assembly in the assembled state thereof to a headliner;

FIG. 14 is a side view of another preferred embodiment of the articulating fastener assembly of the present invention illustrating the flexible, spring-like linking member thereof having a modular connector;

FIG. 15 is a perspective view of another preferred embodiment of the articulating fastener assembly of the present invention that employs the linking member and carrier member of the articulating fastener assembly shown in FIG. 14;

DESCRIPTION OF THE PREFERRED EMBODIMENT(S)

Figure 3:
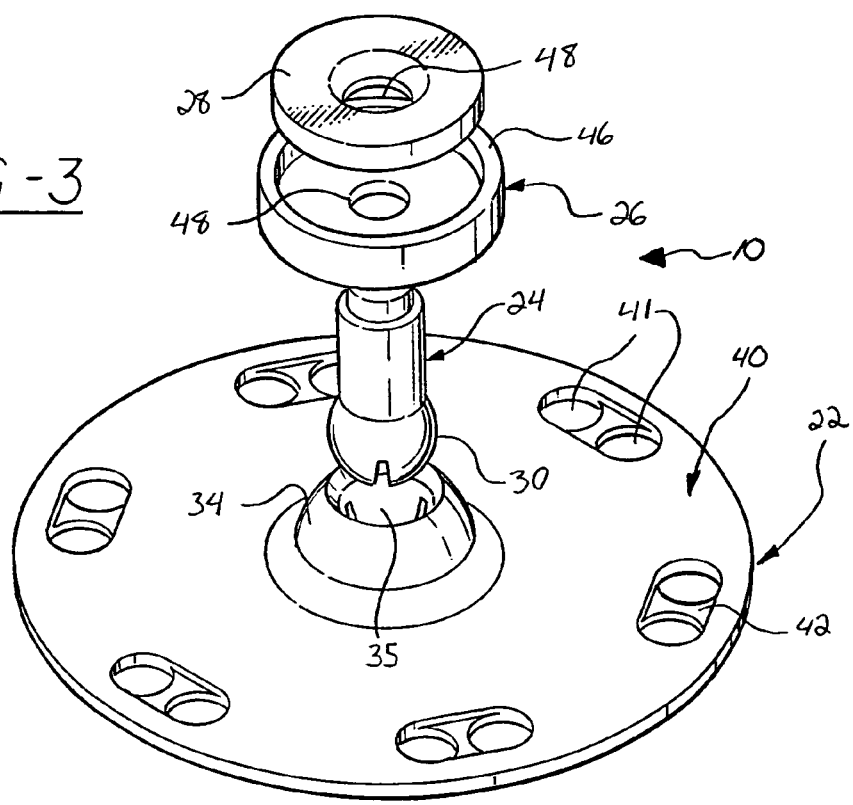
FIG. 3 is an exploded perspective view of the preferred embodiment of the articulating fastener assembly of the present invention shown in FIG. 2 illustrating the base member, linking member, carrier member, and magnet of the articulating fastener assembly in the unassembled state thereof.

The present invention overcomes the disadvantages in the related art in an articulating fastener assembly (fastener assembly) for securely fastening a decorative panel in spaced relation to a support backing. The fastener assembly is described below and shown in the figures in connection with attaching a headliner (a decorative panel) of the passenger compartment of an automotive vehicle to the interior surface of sheet metal (a support backing) of the roof of the body of the automotive vehicle using a magnet as a fastening medium. However, those having ordinary skill in the art will appreciate that the fastener assembly may be used in connection with attaching any two articles of suitable size, shape, and material together with other fastening media, like "Velcro" or "Dual-Lock." Such uses include a pivoting picture frame mounted to a refrigerator, a pivoting document holder used during word-processing, and a pivoting phone-holder for a vehicle, just to name a few. Accordingly, it will be understood that the present invention is in no way limited by the context of the preferred embodiments of the present invention disclosed herein.

A fastener assembly according to the present invention is generally indicated at 10, 110, 210, 310, 410 in FIGS. 1-20, where like numerals are used to designate like structure throughout the various embodiments disclosed herein. Referring initially to FIG. 1, the upper portion of an automotive vehicle is generally indicated at 16. The automotive vehicle is schematically represented and is shown having a passenger compartment 14 or enclosure that is defined by the interior sheet-metal surface 18 of the roof, generally indicated at 20, of the vehicle 16. In FIG. 1, a plurality of fastener assemblies 10, 110, 210, 310, 410 are shown attaching a headliner 12 of the passenger compartment 14 to the interior surface 18 of the roof 20. The fastener assemblies 10, 110, 210, 310, 410 are specifically designed to mount the headliner 12 in spaced relationship with respect to the interior surface 18 of the roof 20. In this way, ductwork wiring and other automotive-related components can be easily accommodated in the space presented between the interior surface 18 and the headliner 12.

With reference to the embodiment illustrated in FIG. 2 and in its most basic form, the fastener assembly 10, 110, 210, 310 includes a base member, generally indicated at 22, 122, 222, 322 a linking member, generally indicated at 24, 124, 224, 324, a carrier member, generally indicated at 26, 126, 226, 326 and a fastening medium 28, 128, 228, 328. The base member 22, 122, 222, 322 is adapted to be operatively mounted to the headliner 12. The linking member 24, 124, 224, 324 operatively extends between the base member 22, 122, 222, 322 and the carrier member 26, 126, 226, 326 such that the base member 22, 122, 222, 322 is disposed spaced from the carrier member 26, 126, 226, 326. The fastening medium 28, 128, 228, 328 is supported by the carrier member 26, 126, 226, 326 and adapted to operatively interconnect the carrier member 26, 126, 226, 326 to the sheet metal 18. The linking member 24, 124, 224, 324 operatively interconnects the base member 22, 122, 222, 322 and the carrier member 26, 126, 226, 326 in articulating fashion such that the base member 22, 122, 222, 322 is transversely moveable relative to the carrier member 26, 126, 226, 326.

Preferably, the base member 22, 122, 222, 322 and/or the carrier member 26, 126, 226, 326 is adapted to swivel through varying angles with respect to the linking member 24, 124, 224, 324. Those having ordinary skill in the art will appreciate that there is a number of mechanical arrangements that will produce articulating movement among the base member 22, 122, 222, 322, the linking member 24, 124, 224, 324, and the carrier member 26, 126, 226, 326. Thus, while there are four different embodiments disclosed herein, those having ordinary skill in the art will appreciate that, within the scope of the appended claims, other means of providing the articulating movement may be possible without departing from the present invention. Accordingly, the various embodiments of the present invention illustrated in the figures will be described in greater detail below.

More specifically and referring now to FIGS. 3 and 3A-3C, the structure of the fastener assembly 10 will be addressed. In this embodiment, the linking member 24 may include a pair of distal ends. One of the distal ends may include a male end portion 30 or a female end portion 32. The base member 22 or the carrier member 26 defines a corresponding female portion 34 or a corresponding male portion 36. The male end portion 30 is adapted to be received in the female portion 34, and the female end portion 32 is adapted to receive the male portion 36 such that the linking member 24 interconnects the base member 22 and the carrier member 26 in articulating fashion.

FIGS. 3 and 3A-3C show a preferred embodiment of the fastener assembly 10 having swiveling characteristics. In this embodiment, the linking member 24 includes a pair of distal ends. One or both of the distal ends defines a ball 30, and the base member 22 and/or the carrier member 26 defines a corresponding socket 34. The ball 30 is adapted to be complimentarily received in the socket 34 to provide swiveling articulation of the base member 22 relative to the carrier member 26.

Alternatively, the linking member 24 can include a pair of distal ends, wherein one or both of the distal ends defines a socket 32 and the base member 22 and/or the carrier member 26 defines a corresponding ball 36. The socket 32 is adapted to complimentarily receive the ball 36 to provide swiveling articulation of the base member 22 relative to the carrier member 26.

Alternatively, the linking member 24 can include a pair of distal ends wherein one distal end defines a ball 30 and the other distal end defines a socket 32. One of the base member 22 or the carrier member 26 defines a corresponding socket 34, and the other base member 22 or carrier member 26 defines a ball 36. The ball 30 of the linking member 24 is adapted to be complimentarily received in the corresponding socket 34, and the socket 32 of the linking member 24 is adapted to complimentarily receive the corresponding ball 36 to provide swiveling articulation of the base member 22 relative to the carrier member 26.

In each of these three alternatives and as shown in FIGS. 3 and 3A-3C, the linking member 24 is of a substantially cylindrical shape. The linking member 24 defines a ball 30 at the distal end of the linking member 24 proximate the base member 22.

Figure 3A:
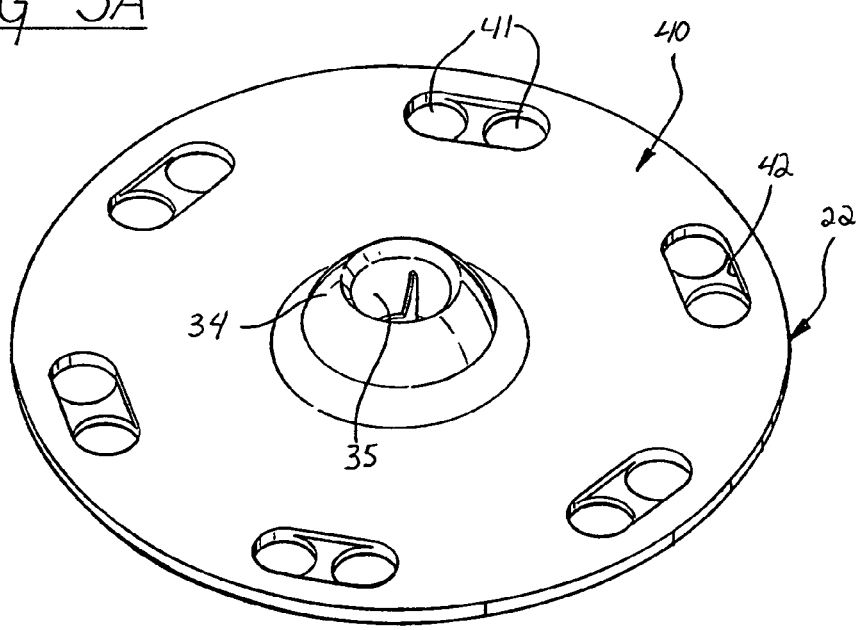
FIG. 3A is a perspective view of the top of the base member of the preferred embodiment of the articulating fastener assembly of the present invention shown in FIG. 3.
Figure 3B:
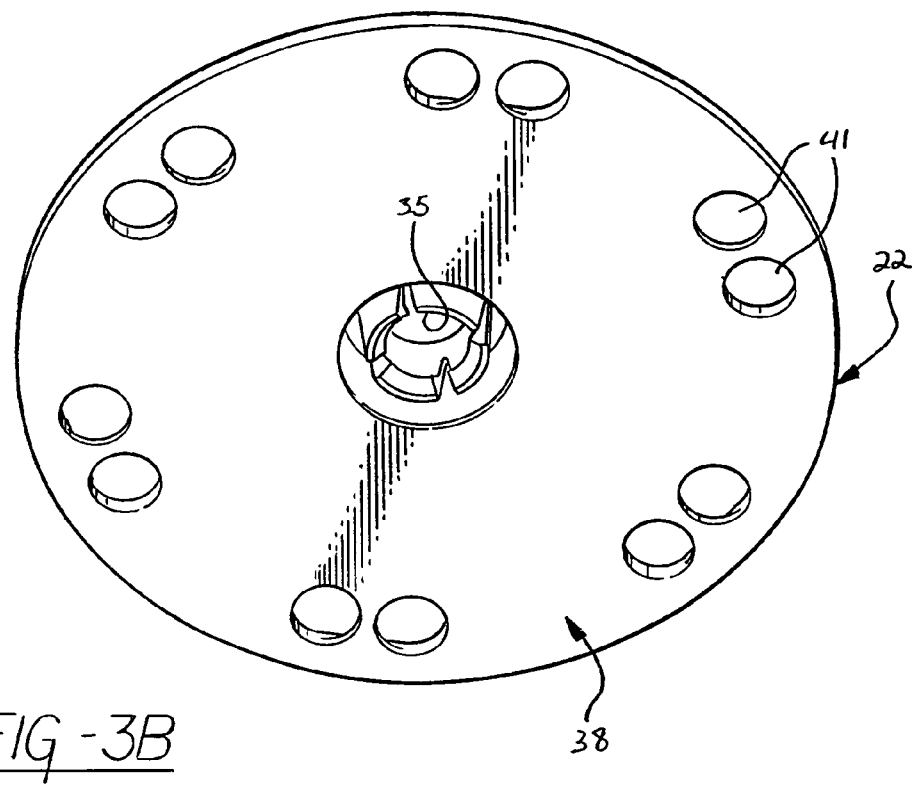
FIG. 3B is a perspective view of the bottom of the base member of the preferred embodiment of the articulating fastener assembly of the present invention shown in FIG. 3.

As best shown in FIGS. 3, 3A, and 3B, the base member 22 is of a substantially circular shape and defines an attaching face, generally indicated at 38, and a linking face, generally indicated at 40. The base member 22 is adapted to be mounted to an attachment area, which is generally indicated at 39 in FIG. 2, of the headliner 12. To that end, the base member 22 has a plurality of uniform sets of holes 41 and scallops 42 disposed substantially equidistantly about the approximate periphery of the base member 22 to permit hot-melt glue 44, best shown in FIG. 2, to flow not only through, but also around, the holes 41 into the area or volume defined between the scallops 42.

As best shown in FIGS. 3, 3A, and 3B, the socket 34 or the ball 36 is defined on a substantially central area of the linking face 40 of the base member 22. In these figures, the base member 22 defines a socket 34. The socket 34 extends above the linking face 40 of the base member 22. The socket 34 is adapted to prevent the ball 30 of the linking member 24 from extending through the attaching face 38 of the base member 22. To this end and as best shown in FIG. 3B, the socket 34 may be defined by a plurality of depending fingers 35 that are adapted to engage and retain the ball 30 in snap-fit relation such that the linking member 24 may articulate relative to the base member 22.

Figure 3C:
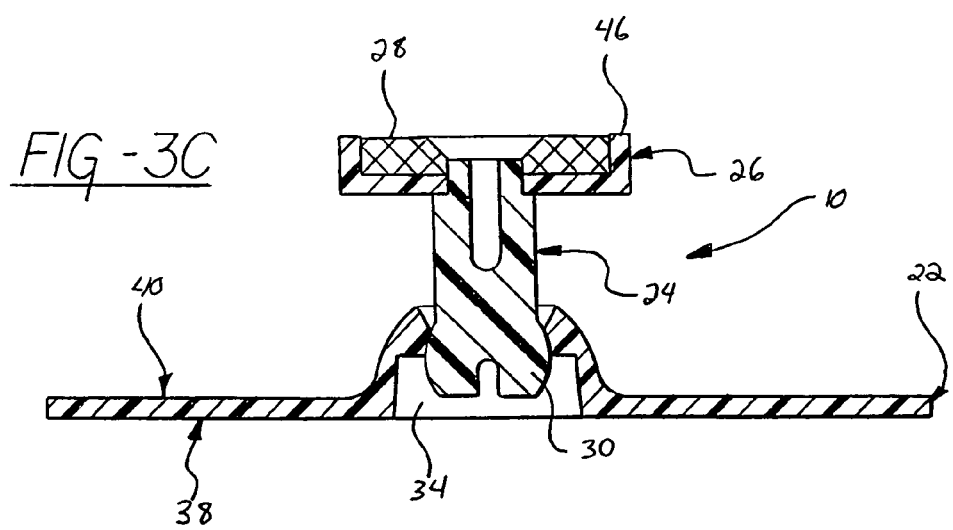
FIG. 3C is a cross-sectional side view of the preferred embodiment of the articulating fastener assembly of the present invention shown in FIG. 3 illustrating the structural relationship of the base member and linking member of the articulating fastener assembly in the assembled state thereof.

As best shown in FIG. 3, in one preferred embodiment, the carrier member 26 is substantially circular and has a diameter substantially smaller than that of the base member 22. Also, as best shown in FIGS. 3 and 3C, the carrier member 26 includes a rim 46 defining a channel interiorly to said rim 46 and surrounding the fastening medium 28. In the preferred embodiment described herein and illustrated throughout the figures, the fastening medium is a magnet 28. However, as will be appreciated from the description that follows, the fastening medium 28 may include any suitable mechanism for adhering the carrier member 26 to the interior surface 18 of the roof 20 of the vehicle 16. The carrier member 26 and the magnet 28 define aligned apertures 48 in a substantially central area thereof adapted to receive the distal end of the linking member 24 opposite the ball 30 of the linking member 24.

To assemble the fastener assembly 10 to the headliner 12, the base member 22 is hot-melt glued to the attachment area of the headliner 12 such that the glue 44 flows through and around the holes 41 and in the scallops 42. This flow essentially forms rivets in the holes 41 to secure the fastener assembly 10 to the headliner 12.

Those having ordinary skill in the art will appreciate that the base member 22 and the carrier member 26 of this embodiment can have any suitable size and shape. Furthermore, the fastener assembly 10 of this embodiment can be assembled to the headliner 12 by any suitable means. Those having ordinary skill in the art will also appreciate that the carrier member 26 of this embodiment can support the magnet 28 by any suitable means.

Figure 5:
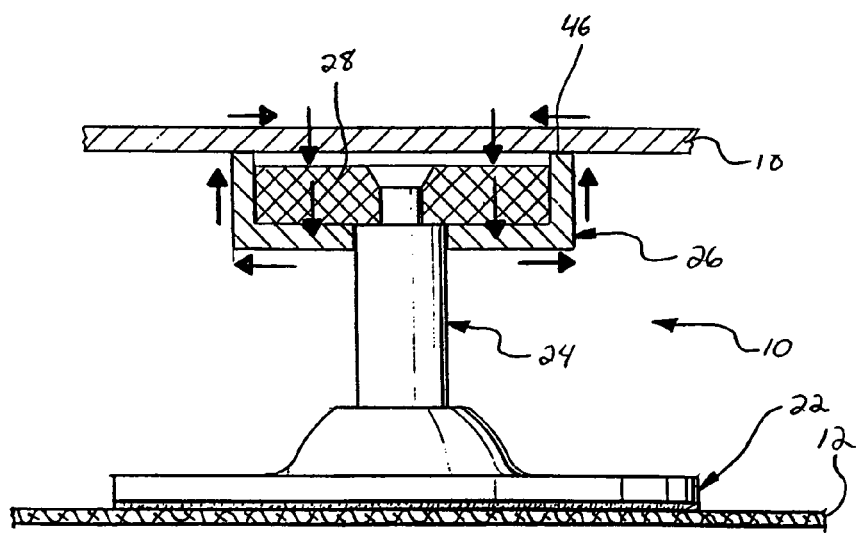
FIG. 5 is a cross-sectional side view of another preferred embodiment of the articulating fastener assembly of the present invention illustrating the magnetic-flux path of the magnet of the articulating fastener assembly in the assembled state of the headliner.

Referring now to FIG. 5, it can be seen that the magnet 28 generates a magnetic flux that attracts the carrier member 26 to the sheet metal 18. The magnetic flux has a magnetic-flux path that travels through the rim 46, through the sheet metal 18, through the magnet 28, and back through the central area of the carrier member 26.

The carrier member 26 and the linking member 24 may be disposed substantially perpendicularly to each other while the base member 22 and the carrier member 26 may be disposed substantially parallel with each other. However, the linking member 24 can pivot through continuously varying angles. In this manner, the carrier member 26 can be attached to the attachment area, which is generally indicated at 37 in FIG. 2, of the sheet metal 18 at varying angles in relation to the linking member 24.

Referring to FIGS. 4 and 6-12, another preferred embodiment of the fastener assembly, having pivoting characteristics, is generally indicated at 110. Similar or like parts of the fastener assembly 110 have similar or like reference numerals with respect to the fastener assembly 10 increased by a factor of one hundred (100). Thus, the fastener assembly 110 includes a base member 122, a carrier member 126, and a linking member 124 extending therebetween and adapted to dispose the base member 122 and the carrier member 126 in spaced relationship with respect to each other.

As best shown in FIG. 6, the linking member 124 may include a pair of distal ends, wherein one distal end includes a male end portion 130 or a female end portion 132 and the other distal end includes a male end portion 130 or a female end portion 132. Each of the base member 122 and the carrier member 126 defines a corresponding female portion 134 or a corresponding male portion 136. The male end portion 130 is adapted to be received in the female portion 134, and the female end portion 132 is adapted to receive the male portion 136 such that the linking member 124 interconnects the base member 122 and the carrier member 126 in articulating fashion.

Where the linking member 124 includes a pair of distal ends, one distal end may include a rod portion 150 or a groove portion 152, and the base member 122 or the carrier member 126 defines a complimentary female portion 154 or a complimentary male portion 156. The rod portion 150 is adapted to be received in the female portion 154, and the groove portion 152 is adapted to receive the male portion 156 such that the linking member 124 interconnects the base member 122 and the carrier member 126 in articulating fashion.

Alternatively, the linking member 124 can include a pair of distal ends, wherein one distal end includes a rod portion 150 or a groove portion 152 and the other distal end includes a rod portion 150 or a groove portion 152. Each of the base member 122 and the carrier member 126 defines a complimentary female portion 154 or a complimentary male portion 156. The rod portion 150 is adapted to be received in the female portion 154, and the groove portion 152 is adapted to receive the male portion 156 such that the linking member 124 interconnects the base member 122 and the carrier member 126 in articulating fashion.

In each of the alternatives and as best shown in FIG. 6, the groove portion 152 of the linking member 124 or the female portion 154 of the base member 122 and/or the carrier member 126 defines a pair of stop portions 158 such that the corresponding base member 122 and/or the corresponding carrier member 126 can articulate through continuously varying angles between the stop portions 158. More specifically, the groove portion 152 of the linking member 124 or the female portion 154 of the base member 122 and/or the carrier member 126 includes a longitudinally extending circumferential opening 160 that defines the pair of stop portions 158. The longitudinal extent of the rod portion 150 of the linking member 124 or the groove portion 152 of the linking member 124 defines an axis about which the corresponding base member 122 and/or the corresponding carrier member 126 can articulate.

Figure 9:
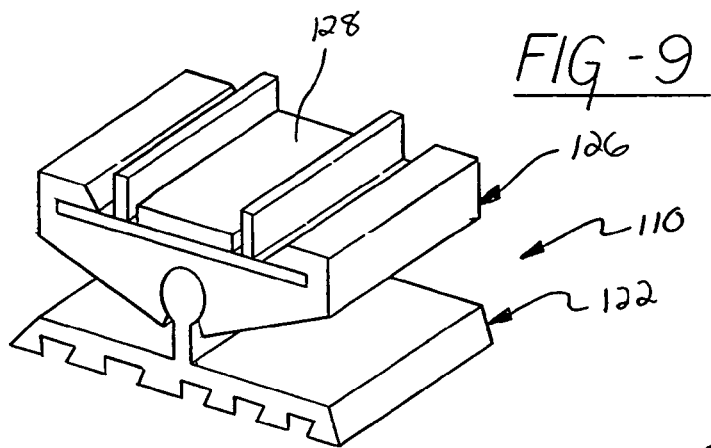
FIG. 9 is a perspective view of another preferred embodiment of the articulating fastener assembly of the present invention.
Figure 10:
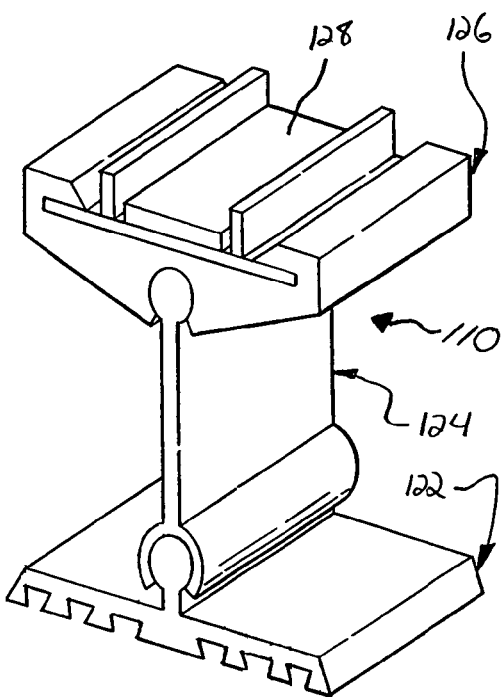
FIG. 10 is a perspective view of the preferred embodiment of the articulating fastener assembly of the present invention shown in FIGS. 4 and 6.

In this manner, the base member 122 can be mounted to the attachment area 39 of the headliner 12 at varying angles in relation to the linking member 124. Also and as shown in FIGS. 9 and 10, the carrier member 126 can articulate longitudinally with respect to the linking member 124 such that the carrier member 126 can conform to the contour of the sheet metal 18.

As best shown in FIGS. 7, 8, 11, and 12, the extent of pivoting and articulation can be varied by narrowing and enlarging the opening 160 defining the pair of stop portions 158. The extent of pivoting and articulation can be varied also by adding stoppers, shoulders, or the like to the groove portion 152 of the linking member 124 or the male portion 156 of the base member 122 and/or the carrier member 126 of various sizes to limit the range of pivotal and articulating motion of the linking member 124.

As best shown in FIG. 6, the base member 122 may have a substantially rectangular shape and define an attaching face, generally indicated at 138, and a linking face, generally indicated at 140. The base member 122 is adapted to be assembled to a headliner, schematically indicated at 12, in any suitable manner. More specifically, the attaching face 138 is adapted to be mounted to the attachment area 39 of the headliner 12. To that end, as best shown in FIGS. 4, 6, 11, and 12, the attaching face 138 may include a plurality of substantially parallel, evenly spaced ribs 162 of substantially uniform thickness and width that may extend transversely the entire base member 122 and define grooves therebetween. The ribs 162 are adapted to be hot-plate welded or fastened by other similar means to the attachment area 39 of the headliner 12. On the other hand, each of the attaching face 138 and the headliner 12 may include a tongue-and-groove configuration such that the attaching face 138 is adapted to be complimentarily mounted to the headliner 12.

Alternatively and as shown in FIG. 7, the base member 122 can be injection-molded to include at least one clip, generally indicated at 164, which has a leg 166 and a foot 168. The clip 164 is formed as a part of the base member 122 and extends substantially perpendicularly from the attaching face 138 in a direction opposite the linking face 140. The clip 164 is adapted to be disposed through a corresponding hole formed in a substrate. The foot 168 of the clip 164 is adapted to engagingly contact the outer surface of the substrate distal the attaching face 138.

Alternatively and as shown in FIG. 8, a two-sided, pressure-sensitive adhesive 170 may be employed to adhere the attaching face 138 to the attachment area 39 of the headliner 12. Preferably, the adhesive is glue 170.

As best shown in FIG. 6, the linking face 140 of the base member 122 is substantially flat and includes a groove portion 152. The groove portion 152 is disposed on and extends above a substantially central portion of the linking face 140 and may extend transversely the entire linking face 140.

Figure 4:
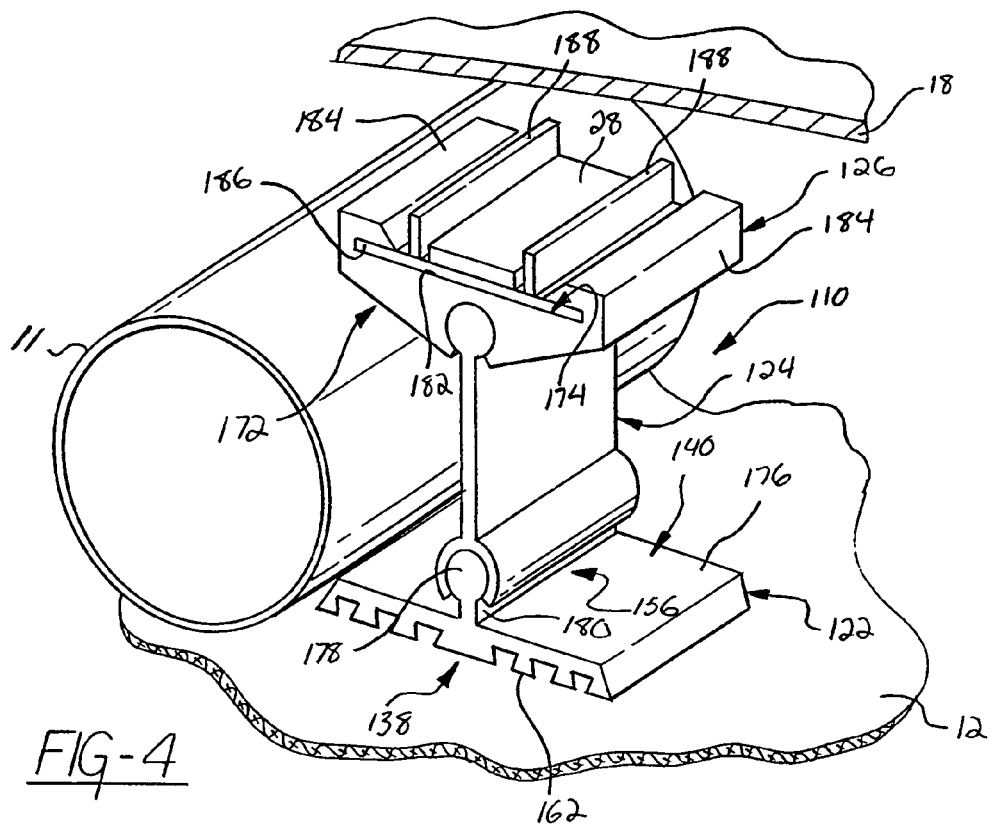
FIG. 4 is an exploded perspective view of another preferred embodiment of the articulating fastener assembly of the present invention illustrating the base member, linking member, and carrier member of the articulating fastener assembly in the unassembled state of the headliner.

As best shown in FIGS. 4 and 6, the linking member 124 in this embodiment has a substantially rectangular shape. The width of the linking member 124 is substantially equal to the width of the base member 122 and the carrier member 126. However, those having ordinary skill in the art will appreciate that the linking member 124 can have any suitable shape and dimensions.

As best shown in FIG. 6, the carrier member 126 may have a substantially rectangular shape and defines a linking face, generally indicated at 172, and a carrying face, generally indicated at 174. The carrier member 126 is adapted to be assembled to the linking member 124 and the sheet metal 18 as will be described in greater detail below.

The linking face 172 presents a facial surface 176 and a male portion, generally indicated at 156. The male portion 156 includes a pole 178 and a co-extensive connecting portion 180, which is disposed between and connects the pole 178 and the facial surface 176. The male portion 156 is disposed on a substantially central portion of the facial surface 176 and extends transversely the entire facial surface 176. The pole 178 is adapted for mating engagement within the groove portion 152 of the linking member 124.

The carrying face 174 is substantially flat and presents a facial surface 182 and a plurality, preferably, a pair, of tabs 184. The carrying face 174 is adapted for attaching engagement with the attachment area 37 of the sheet metal 18. The tabs 184 are disposed substantially parallel with and opposite each other on and coextensively with respective transverse ends of the facial surface 182. Further, each of the tabs 184 is disposed in spaced parallel relationship with the facial surface 182 to define a channel between the tab 184 and the facial surface 182. Each channel is adapted to receive at least a portion of a bracket 186, best shown in FIG. 12, to mount the bracket 186 to the carrying face 174.

The bracket 186 is mounted to the facial surface 182 of the carrying face 174 and acts to support the fastening medium 128, such as a magnet 128. The longitudinal sides of the bracket 186 are received within the channels defined by the tabs 184. The bracket 186 may have a substantially rectangular shape and includes a pair of poles 188 disposed interiorly adjacent the tabs 184 on a substantially longitudinally central portion of the bracket 186. The poles 188 are generally made of the same material as is the bracket 186. The magnet 128 is adapted to be accepted and held by and on a substantially central portion of the bracket 186 between the poles 188 such that a space is defined between each pole 188 and the magnet 128. The tabs 184 exert a force on the bracket 186 in a direction toward the facial surface 182 while the magnet 128 exerts an attractive force with respect to the sheet metal 18. The bracket 186 can be made of any suitable material, such as a cold-roll steel plate.

The magnet 128 may have a substantially rectangular shape and generally has a smaller facial area than that of the bracket 186, although the size of the magnet 128 can vary. The magnet 128 generates a magnetic flux to attach the carrier member 126 to the sheet metal 18. The magnetic flux has a magnetic-flux path that travels through the bracket 186, through one pole 188, through the sheet metal 18, through the other pole 188, through the magnet 128, and back through the bracket 186.

Figure 11:
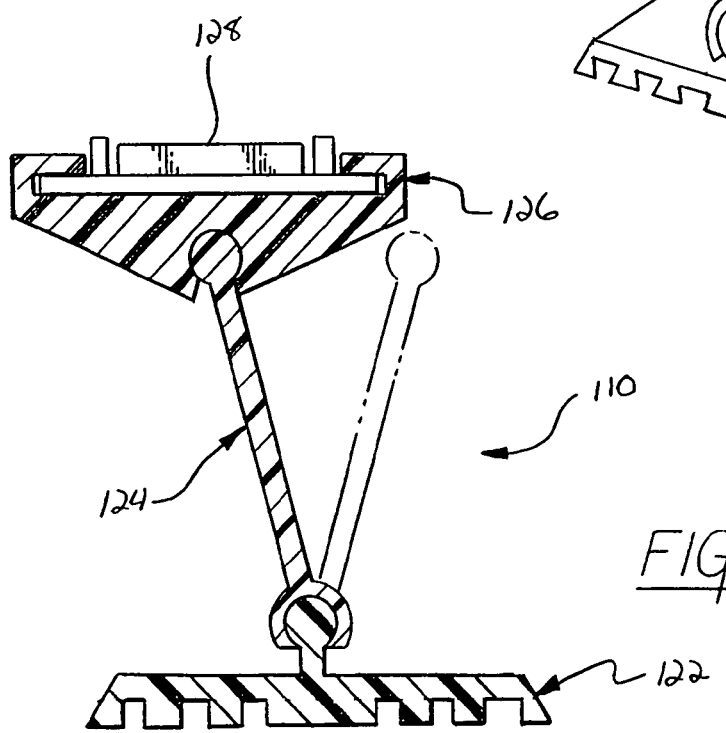
FIG. 11 is a schematic side view of the preferred embodiment of the articulating fastener assembly of the present invention shown in FIGS. 4, 6, and 10 illustrating range of pivot between the base member and carrier member thereof.
Figure 12:
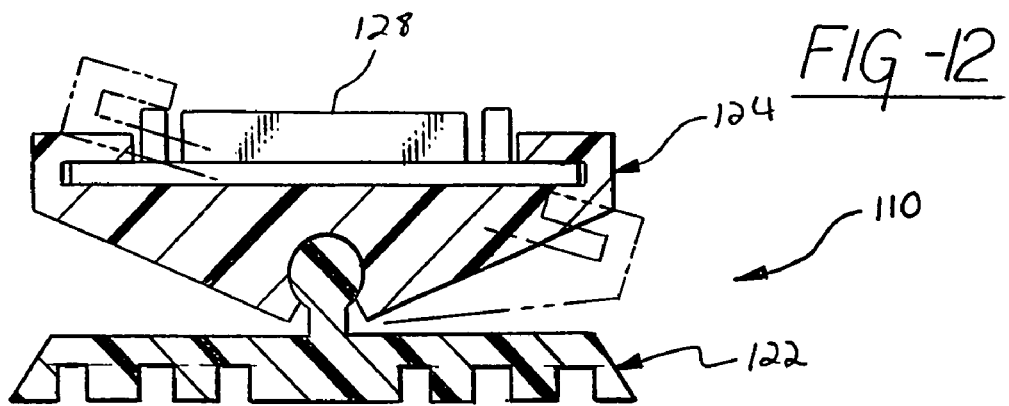
FIG. 12 is a schematic side view of the preferred embodiment of the articulating fastener assembly of the present invention shown in FIG. 9 illustrating variability of articulation of the articulating fastener assembly.

As best illustrated in FIGS. 4 and 6, the carrier member 126 and the linking member 124 may be disposed substantially perpendicularly to each other while the base member 122 and the carrier member 126 are disposed substantially parallel with each other. However, as best shown in FIGS. 10 and 11, the linking member 124 can pivot about the axis defined by the rod portion 150 of the linking member 124 through continuously varying angles. In this manner, the carrier member 126 can be attached to the attachment area of the sheet metal 18 at varying angles in relation to the linking member 124.

Again, the extent of pivoting and articulation can be varied by narrowing and enlarging the opening 160 defining the pair of stop portions 158. The extent of pivoting and articulation can be varied also by adding stoppers, shoulders, or the like (not shown) to the groove portion 152 of the linking member 124 or the male portion 156 of the base member 122 and/or the carrier member 126 of various sizes to limit the range of pivotal and articulating motion of the linking member 124.

The linking member 124 can be interchanged with linking members 124 of various lengths. This way, a varying amount of space between the base member 122 and the carrier member 126, or the headliner 12 and the sheet metal 18, in the assembled state of the headliner 12 can be attained. The length of the linking member 124 may have to be sufficient to permit HVAC ductwork, shown at 11 in FIG. 1, for example, in the space between the headliner 12 and the sheet metal 18. Importantly, the linking member 124 does not stretch under the influence of heat.

Under circumstances requiring a minimal amount of space between the headliner 12 and the sheet metal 18, the carrier member 126 can be assembled directly to the base member 122 without the need for the linking member 124, as shown in FIG. 9. In particular, the pole 178 can be matingly received within the female portion 154 of the base member 122, for instance. As a result, articulation of the base member 122 and the carrier member 126 are retained.

Referring to FIGS. 14 and 15, another preferred embodiment of the fastener assembly is generally indicated at 210. Similar or like parts of the fastener assembly 210 have like reference numerals with respect to the fastener assembly 10 but increased by a factor of two hundred (200). Thus, the fastener assembly 210 includes a base member 222, a carrier member 226, and a linking member 224 extending therebetween and adapted to dispose the base member 222 and carrier member 226 in spaced relationship with respect to each other.

In this embodiment, the linking member 224 includes a spring 290 that provides the articulating movement of the base member 222 relative to the carrier member 226. The spring 290 has a substantially sinusoidal shape and is connected to and extends from a substantially transverse central portion of the carrier member 226. Preferably and as best shown in FIG. 15, the spring 290 is disposed longitudinally coextensively with the carrier member and includes a T-bar 292 formed at an end of the spring 290 opposite the carrier member 226. The base member 222 includes a T-slot 294 complimentary to the T-bar 292, which is adapted to be matingly received and secured within the T-slot 294. The spring 290 can take on many different shapes.

Figure 16:
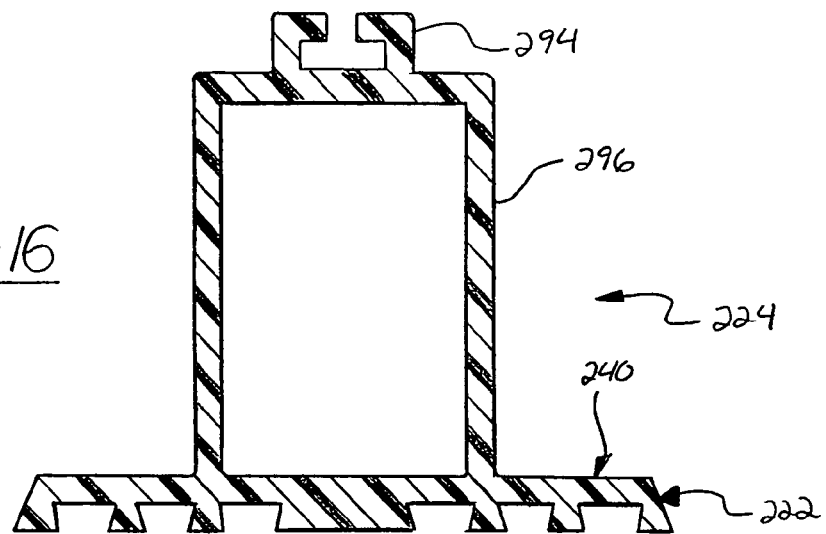
FIG. 16 is a cross-sectional side view of the base member of the preferred embodiment of the articulating fastener assembly of the present invention shown in FIG. 15 illustrating the base member having a particular height.

As shown in FIGS. 15 through 18, the base member 222 may include a box-like structure 296 including the T-slot 294. As best shown in FIG. 16, the box-like structure 296 is substantially hollow and connected to and extends from a substantially transverse central portion of the linking face 240 of the base member 222 opposite the attaching face 238. The box-like structure 296 is disposed longitudinally coextensively with the linking face 240. The T-slot 294 is connected to a substantially transverse central portion of the surface of the box-like structure 296 opposite the attaching face 238 and disposed outwardly of and longitudinally coextensively with the box-like structure 296. The spring 290 provides the fastener 210 with both articulating and pivotal capabilities.

Figure 17:
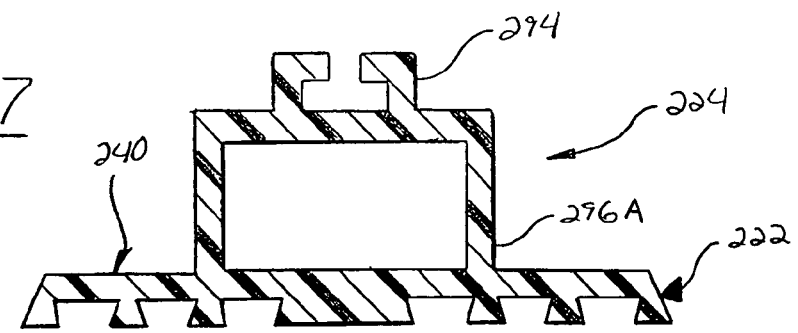
FIG. 17 is a cross-sectional side view of the base member of the preferred embodiment of the articulating fastener assembly of the present invention shown in FIG. 15 illustrating the base member having a particular height less than that of the base member shown in FIG. 16.
Figure 18:
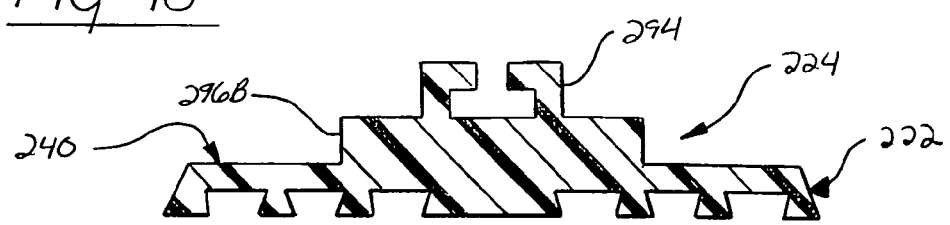
FIG. 18 is a cross-sectional side view of the base member of the preferred embodiment of the articulating fastener assembly of the present invention shown in FIG. 15 illustrating the base member having a particular height less than that of the base member shown in FIG. 17.

As shown in FIGS. 16 through 18, the box-like structure 296 can be interchanged with box-like structures 296A and 296B having various sizes of the dimension from the linking face 240 of the base member 222 to the T-slot 294. This way, a varying amount of space between the base member 222 and the carrier member 226, or the headliner 12 and the sheet metal 18, in the assembled state of the headliner 12 can be attained. In addition, the box-like structure 296 does not stretch under the influence of heat.

Figure 13:
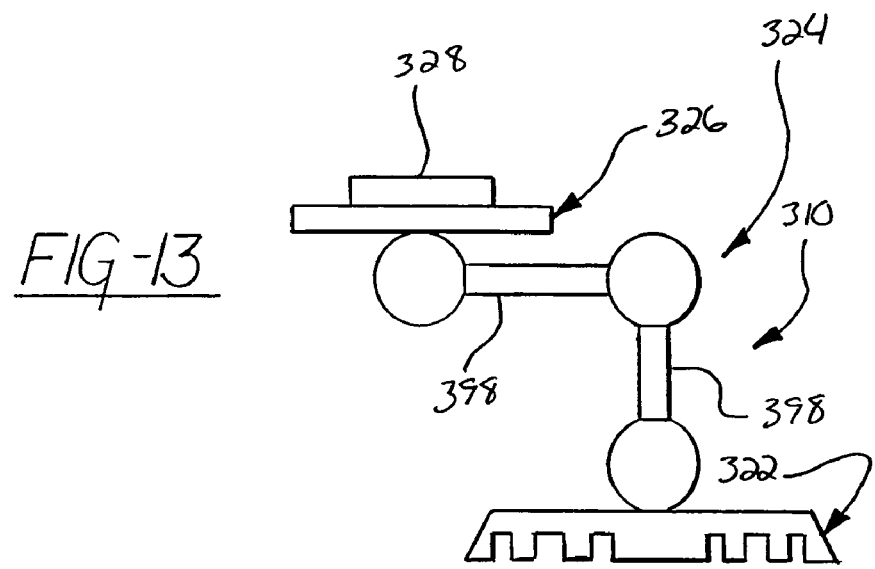
FIG. 13 is a side view of another preferred embodiment of the articulating fastener assembly of the present invention in the assembled state thereof.

Referring to FIG. 13, another preferred embodiment of the fastener assembly is generally indicated at 310. Like or similar parts of the fastener assembly 310 have like reference numerals with respect to the fastener assembly 10 but increased by a factor of three hundred (300). Thus, the fastener assembly 310 includes a base member 322, a carrier member 326, and a linking member 324 extending therebetween and adapted to dispose the base member 322 and carrier member 326 in spaced relationship with respect to each other. In this embodiment, it can easily be seen that the linking member 324 includes a plurality of links 398 adapted to be connected to each other at various angles or in straight lines. This permits the fastener assembly 310 to pivot at various discrete angles, thereby accommodating not only obstructions such as duct work (not shown), but also a varying amount of space between the headliner 12 and the sheet metal 18 in the assembled state of the headliner 12. It should be appreciated by those having ordinary skill in the art that FIG. 14 illustrates the connection of the links 398 to each other. A male/female connection, for example, can be used to connect the links 398 to the base member 322 and the carrier member 326, as illustrated in FIG. 13.

Figure 19:
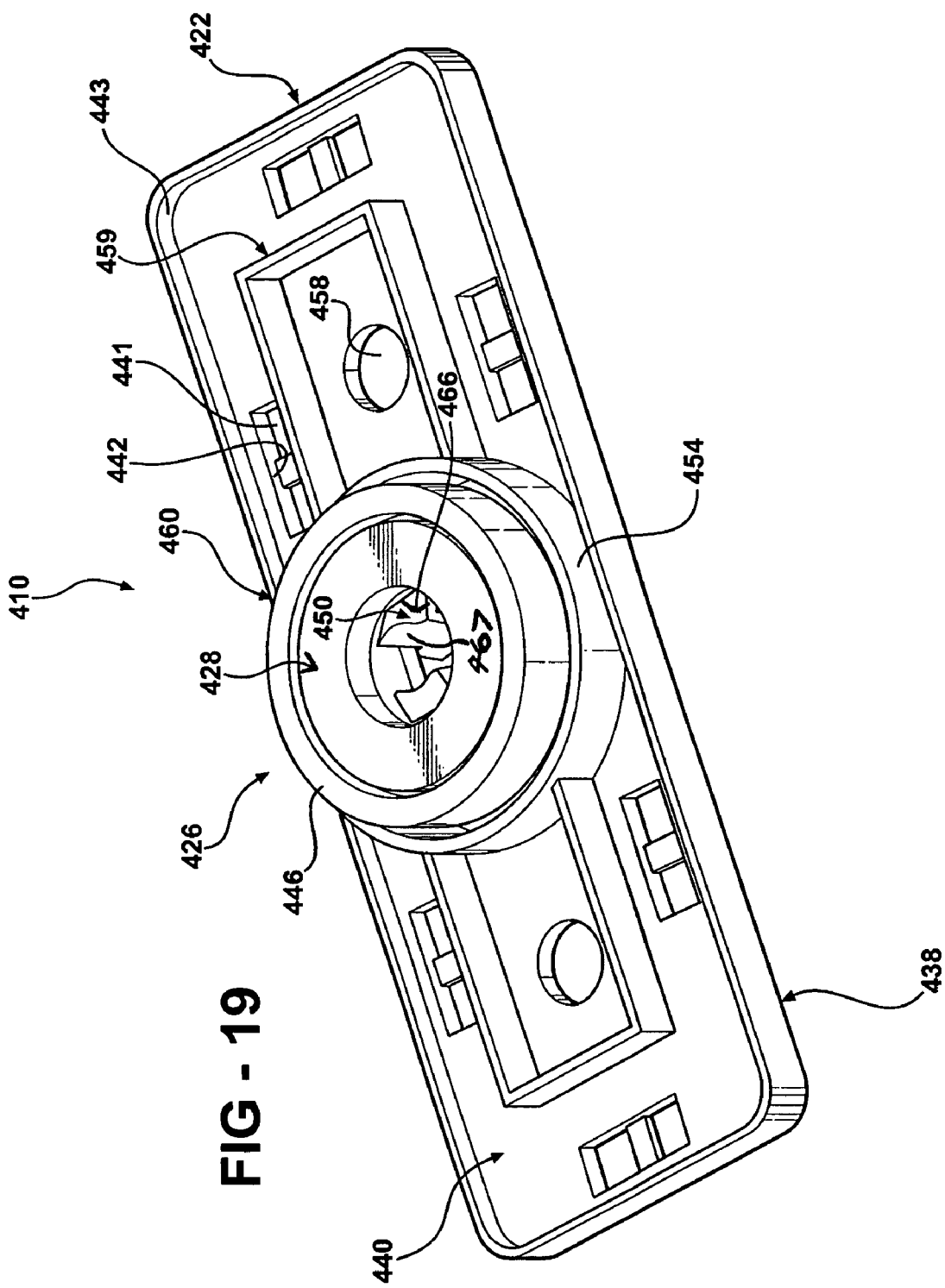
FIG. 19 is a perspective view of another preferred embodiment of the articulating fastener assembly of the present invention in the assembled state.
Figure 20:
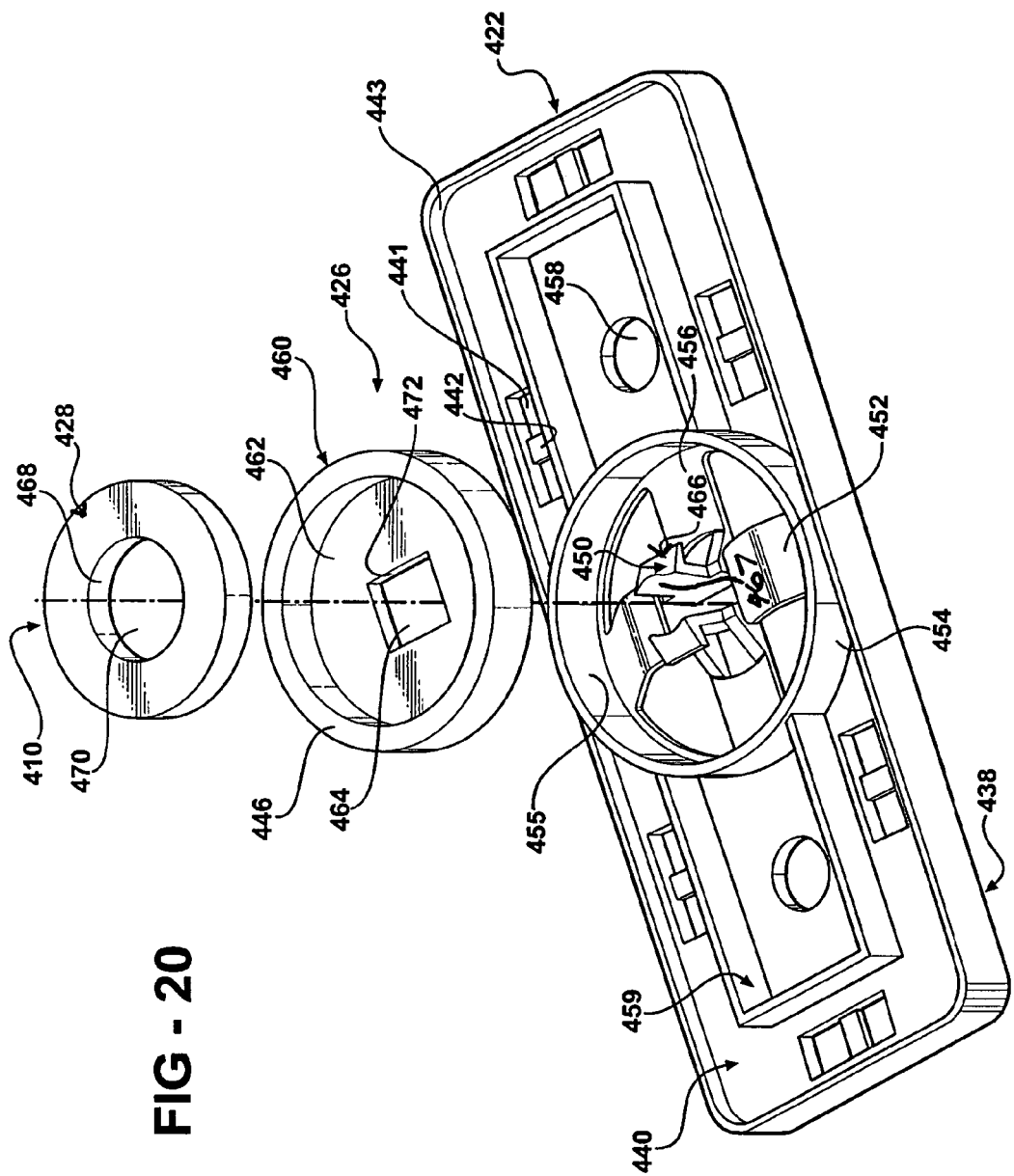
FIG. 20 is an exploded perspective view of the embodiment of the articulating fastener assembly of the present invention shown in FIG. 19 illustrating the base member, linking member, carrier member, and fastening medium of the articulating fastener assembly.
Figure 21:
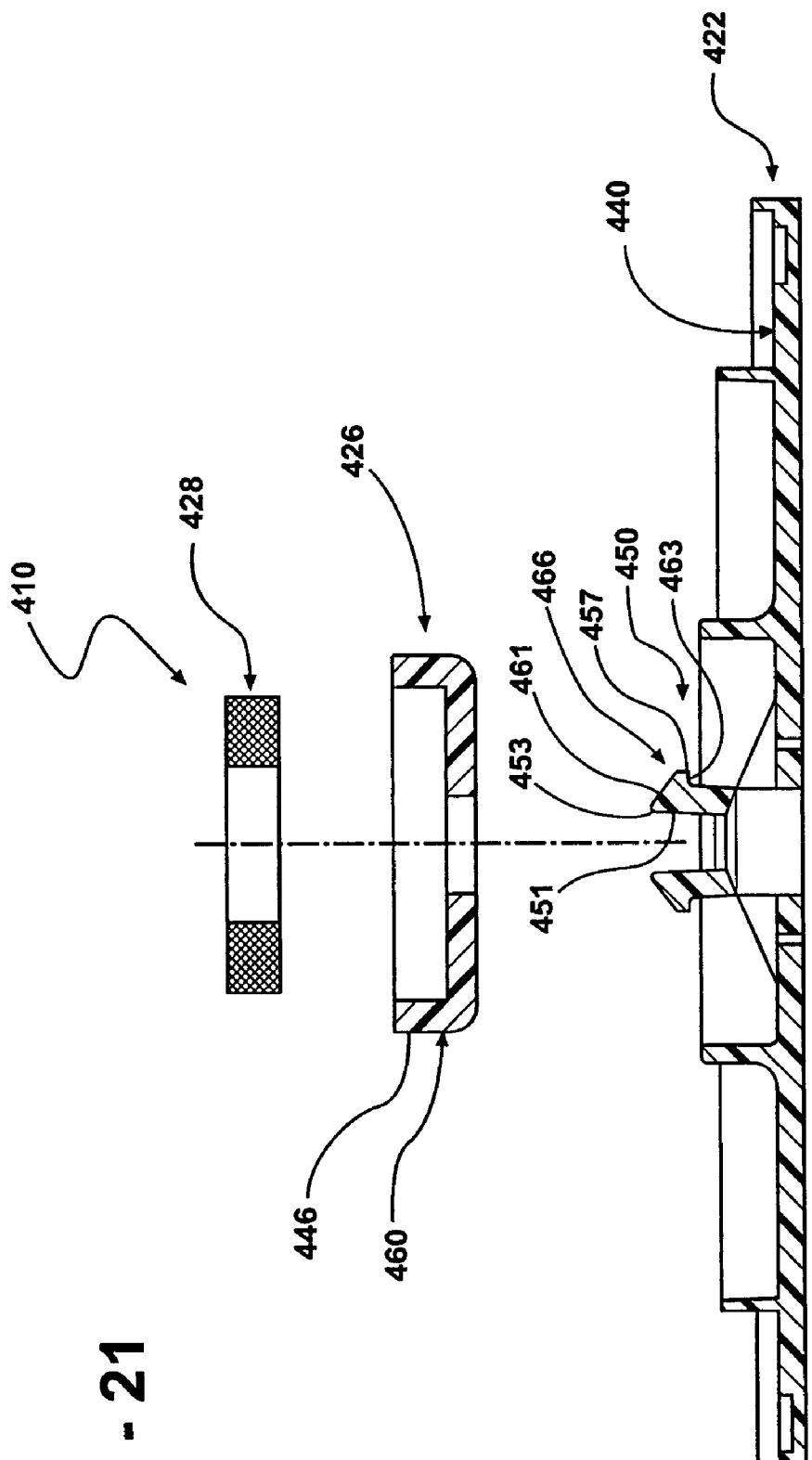
FIG. 21 is an exploded cross-sectional side view of the embodiment of the articulating fastener assembly of the present invention shown in FIG. 20.

Referring to FIGS. 19 through 21, another preferred embodiment of the fastener assembly is generally indicated at 410. Like or similar parts of the fastener assembly 410 have like reference numerals with respect to the fastener assembly 10, but increased by a factor of four hundred (400). Thus, the fastener assembly 410 generally includes a base member 422 adapted to be operatively mounted to the headliner 12, a carrier member 426, and a fastening medium 428 supported by the carrier member 426 and adapted to operatively interconnect the carrier member 426 to the interior surface 18 of the vehicle roof 20. At least one biasing member 452 is adapted to operatively support the carrier member 426 and provide swiveling articulation of the carrier member 426 relative to the base member 422. At least one leg, generally indicated at 450, extends from the base member 422 and is adapted to operatively engage the carrier member 426 so as to attach the carrier member 426 to the base member 422 in articulating fashion.

In a preferred embodiment of the fastener assembly 410 and as shown in FIGS. 19 through 21, the base member 422 is substantially rectangular and has arcuate corners. The base member 422 also defines an attaching face, generally indicated at 438, and a linking face, generally indicated at 440. The linking face 440 defines a substantially uniform rim 443 disposed along substantially the entire perimeter of the linking face 440 and adapted to give structural rigidity to the base member 422. It will be appreciated by those having ordinary skill in the art that the rim 443 is optional and can be nonuniform and be disposed any suitable distance along or extend to any suitable height above the linking face 440.

The base member 422 is adapted to be mounted to the attachment area 39 of the headliner 12. To that end, the base member 422 also has a plurality of uniform sets of holes 441 and scallops 442 disposed substantially equidistantly about the approximate perimeter of the linking face 440. Each hole 441 is defined completely through the attaching and linking faces 438, 440, respectively. The sets of holes 441 and scallops 442 permit hot-melt glue (not shown), for example, to flow not only completely through, but also around, the holes 441 into the area or volume defined between the scallops 442. Preferably, each set includes two substantially rectangular, uniform holes 441 with scallops 442 defined therebetween. Each set also is disposed substantially opposite another set of holes 441 and scallops 442 with respect to the linking face 440.

The base member 422 also includes the leg 450 adapted to operatively engage the carrier member 426 so as to attach the carrier member 426 to the base member 422 in articulating fashion, as will be described in greater detail below. Preferably, the base member 422 includes a pair of opposed legs 450 disposed spaced relative to one another. The pair of legs 450 also extend substantially perpendicularly from a substantially central area of the linking face 440. The pair of legs 450 also may be integrally molded to the linking face 440.

More specifically and as shown in FIG. 21, a foot, generally indicated at 466, is integrally attached to the end of each leg 450 opposite the linking face 440. The foot 466 has a substantially rectangular transverse cross-section, as shown in FIGS. 19 and 20, and a substantially right triangular longitudinal cross-section, as shown in FIG. 21. The foot 466 is also substantially co-extensive with respect to the width of the leg 450. The innermost side 451 of the foot 466 is substantially planar and perpendicular to the linking face 440. As shown in FIGS. 19 and 20, a substantially central portion of the innermost side 451 defines a substantially semi-circular groove 467 in the innermost side 451. The groove 467 extends substantially from the top of the foot 466 to the bottom of the foot 466.

The top side 453 of the foot 466, as viewed in FIG. 21, is substantially planar and parallel with the linking face 440. The outermost side 457 of the foot 466 is substantially planar and perpendicular to the linking face 440. A tapered portion 461 extends from the top side 453 toward the linking face 440 to the outermost side 457. The tapered portion 461 is adapted to permit the carrier member 426 to slide along the foot 466 and into operative snapping engagement with the leg 450 upon operatively attaching the carrier member 426 to the base member 422. The bottom side 463 of the foot 466 is substantially planar and parallel with the linking face 440 and adapted to operatively engage the carrier member 426 so as to attach the carrier member 426 to the base member 422 in articulating fashion.

From the preceding description, it will be appreciated by those having ordinary skill in the art that each of the leg 450 and foot 466 can have any suitable structure and the leg 450 and foot 466 can have any suitable structural relationship with respect to each other and the carrier member 426 so as to attach the carrier member 426 to the base member 422 in articulating fashion. It will also be appreciated that each of the leg 450 and foot 466 can have any suitable size such that the carrier member 426 can be operatively snappingly engaged to the base member 422.

As shown in FIG. 20, the base member 422 further includes the biasing member 452 adapted to operatively support the carrier member 426 and provide swiveling articulation of the carrier member 426 relative to the base member 422. More particularly, the carrier member 426 is adapted to swivel through varying angles relative to the base member 422. Preferably, the base member 422 includes a pair of opposed biasing members 452 disposed spaced relative to one another and substantially at right angles with respect to the pair of legs 450. Each of the biasing members 452 may be a cantilevered spring, as shown in FIG. 20. In the figure, the spring 452 is substantially rectangular and extends arcuately in a direction from the approximate perimeter of the linking face 440 toward the pair of legs 450 such that space is defined between the spring 452 and the linking face 440.

The pair of springs 452 are also adapted to maintain a space between the carrier member 426 and the linking face 440. As such, each spring 452 has a predetermined force constant and height that determine the amount of such space in the operative state of the fastener assembly 410. And, since springs 452 of various sizes and force constants can be used with the base member 422, various space requirements can be satisfied by using shorter or taller biasing members 452 and/or biasing members having greater or lesser force constants.

The base member 422 further includes a wall 454 extending substantially perpendicularly with respect to the linking face 440. The wall 454 is adapted to retain the carrier member 426 on the base member 422 when the carrier member 426 is operatively supported by the pair of springs 452. To that end, the wall 454 is substantially annular or ring-shaped and centered about the pair of legs 450 and the pair of springs 452 such that two opposed arcs of the wall are disposed on respective opposed areas of the approximate lengthwise perimeter of the linking face 440. As shown in FIG. 20, the pair of springs 452 are attached to and extend from respective opposed areas of the bottom 455 of the interior of the wall 454. The pair of springs 452 may be integrally molded to the wall 454. A substantially rectangular, flat connection member 456 interconnects the bottom of each leg 450 to a corresponding area of the bottom 455 of the interior of the wall 454.

As shown in FIGS. 19 and 20, the base member 422 also may define at least one mounting hole 458 and, preferably, a plurality of mounting holes 458 formed entirely through the attaching and linking faces 438, 440, respectively. The holes 458 are adapted to receive a corresponding fastener (not shown) for operatively mounting the attaching face 438 to the headliner 12. In the figures, a substantially circular hole 458 is formed in a substantially central area of each side of the linking face 440 defined by the wall 454. The fastener may be glue, a rivet, or a screw, for example. However, those having ordinary skill in the art will appreciate that the hole 458 may be of any suitable shape and the fastener may be of any suitable type calculated to mount the base member 422 to the headliner 12.

In a preferred embodiment of the fastener assembly 410, the base member 422 further includes at least one upstanding rib, generally indicated at 459, extending substantially perpendicularly with respect to the linking face 440. The rib 459 is adapted to give structural integrity to the base member 422. Preferably and as shown in FIGS. 19 and 20, a pair of substantially rectangular ribs 459 are centered about the respective mounting holes 458 such that the ribs 459 are disposed within the area defined by the perimeter of the holes and scallops 441, 442, respectively. More specifically, the ribs 459 are disposed on substantially opposite sides of the wall 454 such that one side of each rib 459 consists of the wall 454, which has a greater height than that of the other three sides of the rib 459. The other three sides are of substantially equal height with respect to each other. Also, the distance from the side of the rib 459 opposite the wall 454 to the nearest end of the base member 422 is greater than the distance from the sides of the rib 459 adjacent the wall 454 to the respective sides of the base member 422. Further, the ribs 459 are integrally molded to the base member 422.

However, those having ordinary skill in the art will appreciate that any rib 459 is optional and the base member 422 can include any suitable number of ribs 459. Those having ordinary skill in the art will also appreciate that each rib 459 can have any suitable size, shape, and location with respect to the base member 422 and the sides of the rib 459 can have any suitable size, shape, and location with respect to each other. Those having ordinary skill in the art will also appreciate that the ribs 459 can have any suitable size, shape, and location with respect to each other.

As shown in FIGS. 19 and 20, the carrier member 426 is substantially annular and has a diameter smaller than that of the wall 454. The carrier member 426 also includes a shallow, cup-shaped, magnetic body, generally indicated at 460, having a rim 446 defining a channel interiorly to the rim 446 and surrounding the fastening medium 428. The carrier member 426 also defines a carrying face 462 adapted to carry the fastening medium 428 to fasten the carrier member 426 to the sheet metal 18.

More specifically, a hole 464 is defined completely through the carrying face 462 for receiving the pair of legs 450 for operative attachment of the pair of legs 450 to the carrier member 426 such that the carrier member 426 is operatively attached to the base member 422 in articulating fashion. As shown in FIGS. 19 and 20, the hole 464 is substantially centered in the carrier member 426. Also as shown, it is preferred that the hole 464 be substantially rectangular, in general, and square, in particular. However, those having ordinary skill in the art will appreciate that the hole 464 can have any suitable shape, such as circular. In this latter case, it is preferred that the diameter of the hole 464 be substantially 6.0 mm. Those having ordinary skill in the art will also appreciate that the hole 464 can be located at any suitable location in the carrier member 426.

More precisely and as described above, each foot 466 is adapted to snappingly engage the carrying face 462 such that the carrier member 426 is operatively attached to the base member 422. As increasing axial loads are applied to the fastening medium 428, the pair of legs 450 are adapted to be correspondingly displaced inwardly such that the respective feet 466 are moved toward the midpoint of the hole 464 such that the hole 464 can receive the pair of legs 450.

In the preferred embodiment, the substantially entire surface of the top of the rim 446 of the carrier member 426 is substantially planar, as shown in FIG. 21, and parallel with the surface of the top of the fastening medium 428, as shown in FIG. 19. As a result, the distance between the top surface of the fastening medium 428 and the plane defined by the top surface of the rim 446 is substantially uniform over the surface area of the top of the fastening medium 428. In this way, rocking, buzzing, squeaking, and/or rattling of the fastener assembly 410 is reduced or avoided during operation of the fastener assembly 410. Those having ordinary skill in the art will appreciate that the top surface of the fastening medium 428 can be any suitable distance from the plane defined by the top surface of the rim 446.

The fastening medium 428 can be a magnet, Velcro®, or Dual-Lock®, for example. The magnet 428, for instance, generates a magnetic flux to operatively interconnect, or attract, the carrier member 426 to the sheet metal 18. More precisely, the magnetic flux has a magnetic-flux path that travels through the rim 446, through the sheet metal 18, through the magnet 428, and back through the central area of the carrier member 426. Preferably, the magnet 428 is made of neodymium.

As shown in FIG. 20, the magnet 428 is substantially doughnut-shaped to define an inner side 468 and inner diameter of the magnet 428 and a hole 470 adapted to receive the pair of legs 450. Correspondingly, the carrier member 426 is also substantially doughnut-shaped to define an inner side 472 and inner diameter of the carrier member 426. As shown in FIGS. 19 through 21, the inner diameter of the magnet 428 is greater than the inner diameter of the carrier member 426 such that the pair of legs 450 are disposed spaced from the inner side 468 of the magnet 428 in the operative position of the fastener assembly 410.

The roundness of the magnet 428 provides relatively greater surface area and, thus, efficiency of magnetic force supplied by the magnet 428. The use of a round magnet 428 also provides relatively greater flexibility in varying the magnetic force supplied by the magnet 428. More specifically, the size of the inner diameter of the magnet 428 can be easily changed or varied to a desired size and, thus, provide a desired magnitude of magnetic force supplied by the magnet 428. However, those having ordinary skill in the art will appreciate that the fastening medium 428 can have any suitable size and shape to operatively interconnect, or attract, the carrier member 426 to the sheet metal 18 and receive the pair of legs 450.

The base member 422 and the carrier member 426 may be disposed substantially parallel with each other. However, the pair of springs 452 allow the carrier member 426 to pivot through continuously varying angles with respect to the base member 422. In this manner, the carrier member 426 can be attached to the attachment area 37 of the sheet metal 18 at varying angles in relation to the base member 422.

Figure 22:
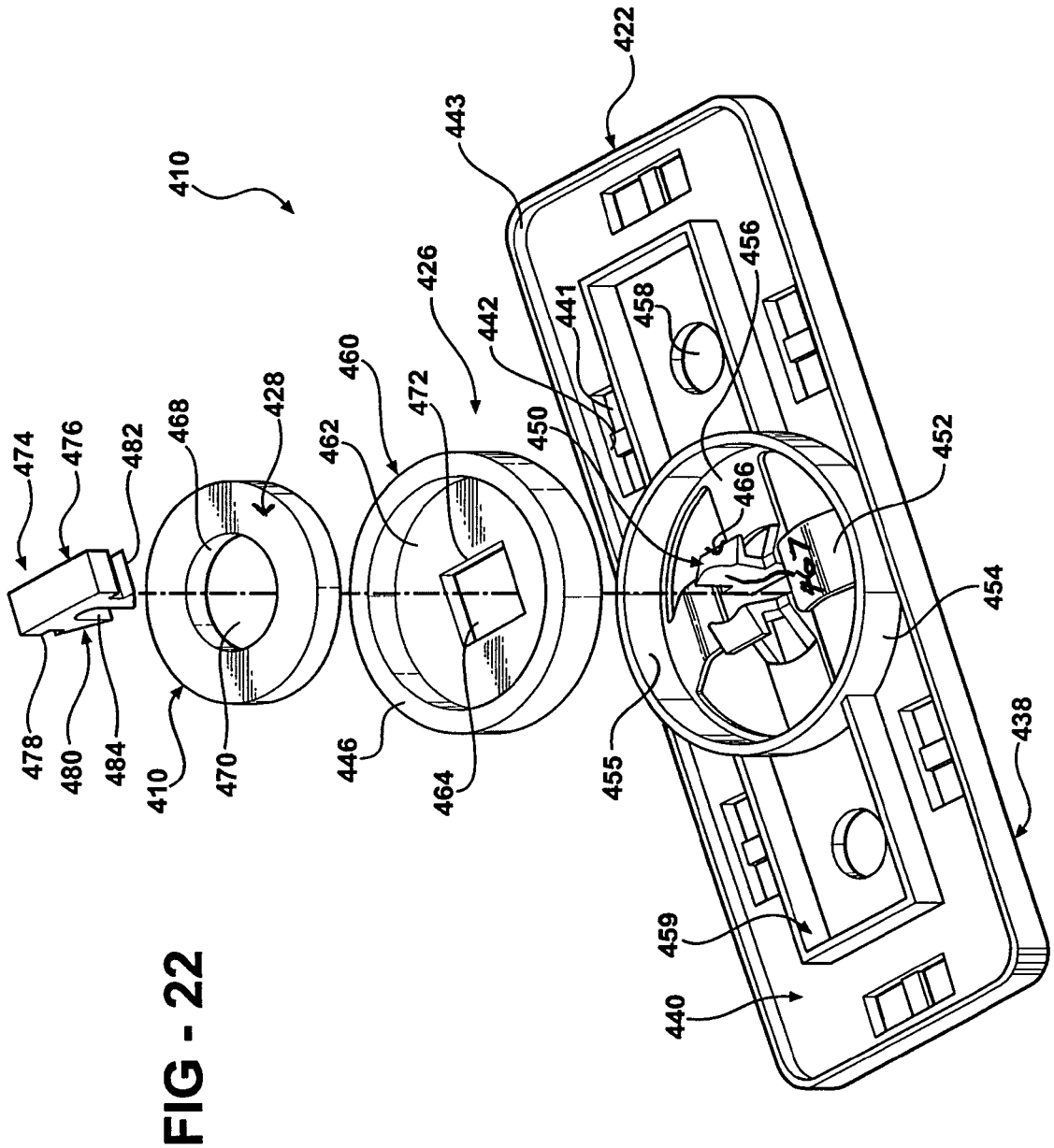
FIG. 22 is another exploded perspective view of the embodiment of the articulating fastener assembly of the present invention shown in FIG. 19 including a fastening member illustrating the base member, linking member, carrier member, fastening medium, and fastening member of the articulating fastener assembly.
Figure 23:
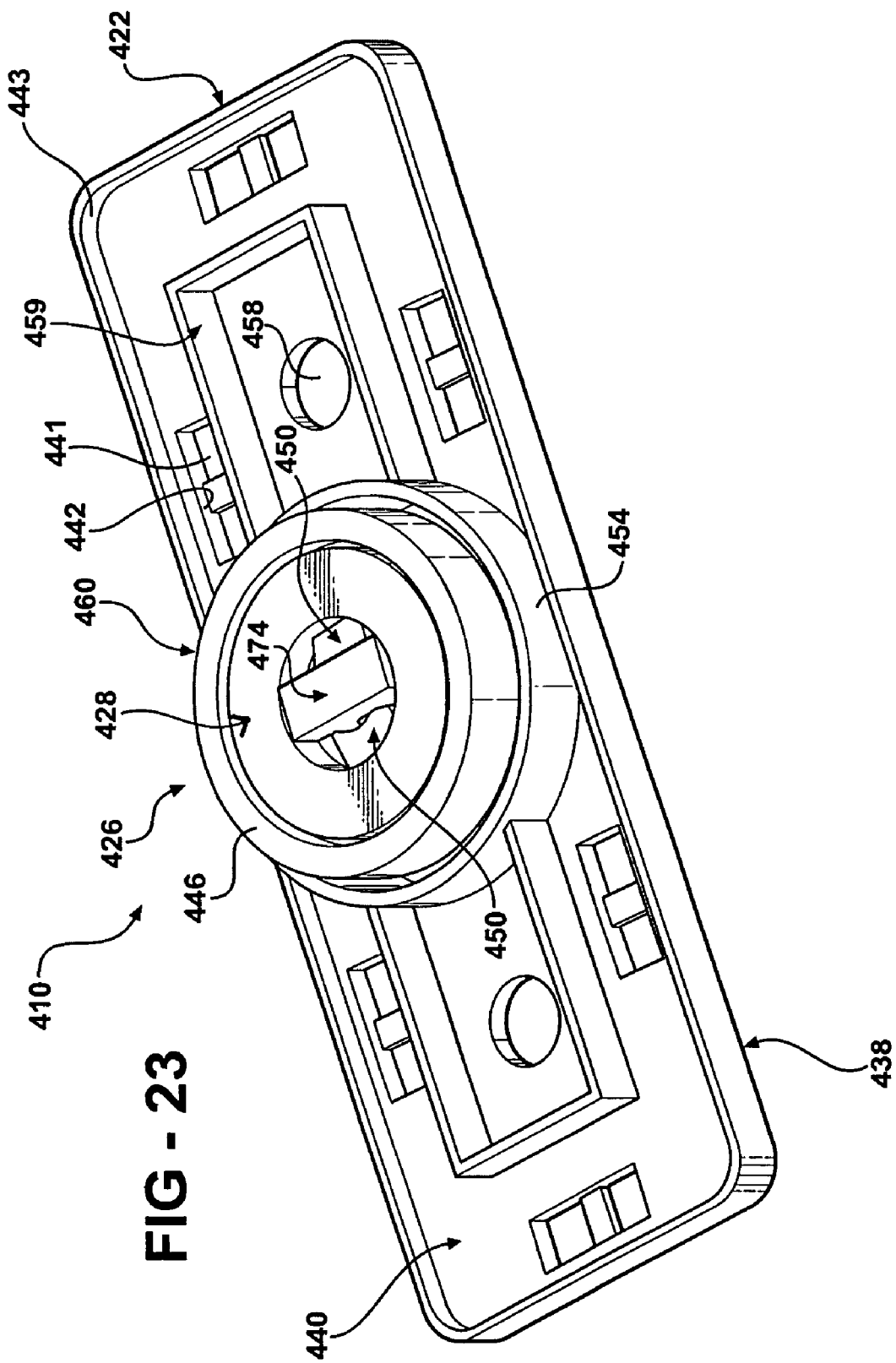
FIG. 23 is another perspective view of the embodiment of the articulating fastener assembly of the present invention shown in FIG. 19 including a fastening member.

Referring to FIGS. 22 and 23, the fastener assembly 410 can also include a fastening member, generally indicated at 474, adapted to removably fasten the magnet 428 to the carrier member 426 and to further attach the carrier member 426 to the base member 422 in articulating fashion. More specifically and as shown in FIG. 22, the fastening member 474 is adapted to be disposed through the hole 470 of the magnet 428 and the hole 464 of the carrying face 462 of the carrier member 426 to removably fasten the magnet 428 to the carrying face 462. The fastening member 474 is also adapted to operatively engage the base member 422 so as to further attach the carrier member 426 to the base member 422 in articulating fashion.

To this end and as shown in FIG. 22, the fastening member 474 includes a substantially rectangular body portion, generally indicated at 476, having a longitudinal edge 478 and at least one leg, generally indicated at 480, extending from the longitudinal edge 478. The longitudinal edge 478 is adapted to operatively contact the facial surface of the magnet 428 opposite the carrying face 462 in a substantially flush manner, and the leg 480 is adapted to operatively engage the base member 422. In this way, the body portion 476 applies a substantially perpendicular force unto the magnet 428 sufficient in magnitude to hold the magnet 428 to the carrying face 462, and the carrier member 426 is attached to the base member 422 in articulating fashion.

More precisely, the leg 480 is adapted to operatively engage a corresponding biasing member 452 of the base member 422. To this end, the leg 480 includes a flange 482 extending substantially perpendicular from the end of the leg 480 opposite the body portion 476. The flange 482 is adapted to snappingly engage the surface of the corresponding biasing member 452 opposite the carrier member 426.

As shown in FIG. 22, the fastening member 474 preferably includes a pair of opposed legs, generally indicated at 480, disposed spaced relative to one another such that a U-shaped space 484 is defined between the legs 480 and adjacent a substantially central portion of the longitudinal edge 478. The pair of legs include a pair of opposed flanges 482 extending substantially outward with respect to the space 484. The flanges 482 are adapted to snappingly engage the respective surfaces of a corresponding pair of biasing members 452 opposite the carrier member 426.

Those having ordinary skill in the art will appreciate that the fastening member 474 is optional and can have any suitable shape, size, and/or structure to removably fasten the magnet 428 to the carrier member 426. Those having ordinary skill in the art will also appreciate that the fastening member 474 can further attach the carrier member 426 to the base member 422 in articulating fashion by any suitable means.

To assemble the fastener assembly 410 to the headliner 12, the base member 422 is hot-melt glued to the attachment area 39 of the headliner 12 such that the glue flows through and around the holes 441 and in the scallops 442. This flow essentially forms rivets in the holes 441 to secure the fastener assembly 410 to the headliner 12. Fasteners may also be employed through the respective mounting holes 458 to mount the fastener assembly 410 to the headliner 12.

In connection with this preferred embodiment of the fastener assembly 410, those having ordinary skill in the art will appreciate that the base member 422, any elements of the base member 422, the carrier member 426, and the fastening medium 428 can have any suitable size, shape, and structural relationship with respect to each other. Furthermore, the fastener assembly 410 can be assembled to the headliner 12 by any suitable means, and the carrier member 426 can support the fastening medium 428 by any suitable means.

To assemble the fastener assembly 10, 110, 210, 310, 410 to the headliner 12, strategic positions for the attachment areas 39, 37 of the headliner 12 and the sheet metal 18, respectively, are determined. The base member 22, 122, 222, 322, 422 of a fastener assembly 10, 110, 210, 310, 410 is then attached to each attachment area 39 of the headliner 12 such that the fastener assembly 10, 110, 210, 310, 410 is secured to the headliner 12. Next, the fastener assembly 10, 110, 210, 310, 410 is moved toward a corresponding attachment area 37 of the sheet metal 18 with the face of the magnet 28, 128, 228, 328, 428 substantially parallel with such attachment area 37. The magnet 28, 128, 228, 328, 428 is magnetically attracted to the sheet metal 18 such that the fastener assembly 10, 110, 210, 310, 410 is secured to the sheet metal 18. The ability of the base member 22, 122, 222, 322, 422 and the carrier member 26, 126, 226, 326, 426 to articulate allows the fastener assembly 10, 110, 210, 310, 410 to make the attachment even if the attachment areas 39, 37 of the headliner 12 and the sheet metal 18, respectively, are curved. The ability of the linking member 24, 124, 224, 324 or the carrier member 426 with respect to the base member 422 to pivot through various angles permits the fastener assembly 10, 110, 210, 310, 410 to make the attachment even if the attachment areas 39, 37 of the headliner 12 and the sheet metal 18, respectively, are not aligned.

In operation, the fastener assembly 10, 110, 210, 310, 410 acts to mount the headliner 12 to the sheet metal 18 while maintaining a space between them determined by the length of the linking member 24, 124, 224, 324 or the heights and/or force constants of the respective biasing members 452. Since variously sized linking members 24, 124, 224, 324 can be interchangeably assembled to the base member 22, 122, 222, 322 and the carrier member 26, 126, 226, 326, various space requirements can be satisfied by using shorter or longer linking members 24, 124, 224, 324. And, since biasing members 452 of various sizes and force constants can be used with the base member 422, various space requirements can be satisfied by using shorter or taller biasing members 452 and/or biasing members having greater or lesser force constants.

It is necessary that the magnetic attraction between the magnet 28, 128, 228, 328, 428 and the sheet metal 18 be sufficiently strong to hold the magnet 28, 128, 228, 328, 428 to the sheet metal 18. The carrier member 26, 126, 226, 326, 426 is designed to hold any type of magnet, including a neodymium magnet, as well as a ferrite magnet. However, it should be noted that a neodymium magnet is the strongest magnet manufactured in the world. U.S. Pat. Nos. 5,905,424; 5,725,792; 5,514,224; and 5,352,301 provide additional information on magnets of sufficient strength to secure the headliner 12 to the sheet metal 18. The strength of the magnet 28, 128, 228, 328, 428 ultimately depends upon the attachment requirements.

Assembling and disassembling the headliner 12 using the fastener assembly 10, 110, 210, 310, 410 does not damage the headliner 12 and is less time-consuming, less costly, and easier and requires less labor than when using some of the fastener assemblies known in the related art. Furthermore, when the headliner 12 is in the assembled state, the fastener assembly 10, 110, 210, 310, 410 is not visible to passengers within the passenger compartment 14 of the automotive vehicle 16, and, thus, the headliner 12 is more aesthetically pleasing than when using some of the fastener assemblies known in the related art. Moreover, the fastener assembly 10, 110, 210, 310, 410 articulates such that it can conform to the contours of the headliner 12 and the sheet metal 18, pivots such that the attachment area 39 of the headliner 12 can be mounted to the attachment area 37 of the sheet metal 18 at varying angles, and permits a varying amount of space between the headliner 12 and the sheet metal 18. Meanwhile, the fastener assembly 10, 110, 210, 310, 410 does not stretch under the influence of heat, so the headliner 12 does not sag.

The base member 422 of the fastener assembly 410 can be designed to conform to a headliner 12 having substantially any shape and contour. Also, the fastener assembly 410 can accept substantially any size fastening medium 428. Further, the shape of the carrier member 426 allows for more surface-area contact to the sheet metal 18 and eliminates the need for complete flatness of the carrier member 426. In addition, the magnetic body 460 of the carrier member 426 provides improved flux circuitry and, thus, superior holding forces. Moreover, the magnetic body 460 and the fastening medium 428 can be customized to a particular holding requirement.

The round magnet 428 provides relatively greater surface area and, thus, efficiency of magnetic force supplied by the magnet 428. The round magnet 428 also provides relatively greater flexibility in varying the magnetic force supplied by the magnet 428. Furthermore, the relatively easier manufacturing of the carrier member 426 can provide precisely even surfaces of the carrier member 426 to, thus, reduce or eliminate, rocking, buzzing, squeaking, and rattling of the assembly 410 during operation of the assembly 410. In addition, the shape of the legs 450 provides structural integrity to the assembly 410.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fastener assembly for securely fastening a decorative panel in spaced relation to an interior surface of a vehicle body, said fastener assembly comprising:
    a base member adapted to be operatively mounted to the decorative panel;
    a carrier member operatively supported by said base member and including a body defining a receptacle;
    a fastening medium supported in said receptacle of said carrier member and adapted to operatively interconnect said carrier member to the interior surface of a vehicle body, wherein said fastening medium is selected from the group consisting of a magnet and reclosable, adhesive-backed, flexible fasteners;
    said carrier member moveably supported by said base member such that said carrier member may be articulated through continuously varying angles with respect to said base member so as to attach said carrier member to said base member in articulating fashion.

2. The fastener assembly as set forth in claim 1, further including at least one biasing member adapted to operatively support said carrier member and provide swiveling articulation of the carrier member relative to said base member and at least one leg extending from said base member and adapted to operatively engage said carrier member so as to attach said carrier member to said base member in articulating fashion.

3. The fastener assembly as set forth in claim 2, wherein said base member includes a pair of opposed biasing members disposed spaced relative to one another and about said at least one leg.

4. The fastener assembly as set forth in claim 3, wherein said base member includes a pair of opposed, spaced legs and said pair of biasing members are disposed substantially perpendicular to said pair of legs.

5. The fastener assembly as set forth in claim 2, wherein said at least one biasing member is a cantilevered spring extending toward said at least one leg.

6. The fastener assembly as set forth in claim 1, wherein said body of said carrier member is a substantially shallow and cup-shaped having a rim defining a channel interiorly to said rim and surrounding said fastening medium.

7. The fastener assembly as set forth in claim 6, wherein a top surface of said rim of said carrier member defines a plane that is substantially operatively parallel with substantially the entire surface of a top of said fastening medium such that the operative distance between the substantially entire top surface of said fastening medium and said plane is substantially uniform over the substantially entire top surface of said fastening medium.

8. The fastener assembly as set forth in claim 1, wherein said fastening medium is a magnet generating a magnetic flux to operatively interconnect said carrier member to the support backing.

9. The fastener assembly as set forth in claim 8, wherein said magnet is made of neodymium.

10. The fastener assembly as set forth in claim 8, wherein said magnet is substantially doughnut-shaped to define an inner side and inner diameter of said magnet and a hole adapted to receive said at least one leg of said base member.

11. The fastener assembly as set forth in claim 10, wherein said carrier member is substantially doughnut-shaped to define an inner side and inner diameter of said carrier member and a hole adapted to receive said at least one leg of said base member.

12. The fastener assembly as set forth in claim 11, wherein said inner diameter of said magnet is greater than the inner diameter of said carrier member such that said at least one leg is disposed spaced from said inner side of said magnet.

13. The fastener assembly as set forth in claim 11, wherein said fastener assembly further includes a fastening member adapted to removably fasten said fastening medium to said carrier member and to further attach said carrier member to said base member in articulating fashion.

14. The fastener assembly as set forth in claim 13, wherein said fastening member is adapted to be disposed through said hole of said magnet and said hole of said carrier member to removably fasten said magnet to said carrier member and to operatively engage said base member so as to further attach said carrier member to said base member in articulating fashion.

15. The fastener assembly as set forth in claim 14, wherein said fastening member includes at least one leg adapted to operatively engage said base member so as to attach said carrier member to said base member in articulating fashion.

16. The fastener assembly as set forth in claim 15, wherein said at least one leg of said fastening member is adapted to operatively engage corresponding said at least one biasing member of said base member so as to attach said carrier member to said base member in articulating fashion.

17. The fastener assembly as set forth in claim 16, wherein said at least one leg of said fastening member includes a flange adapted to snappingly engage corresponding said at least one biasing member so as to attach said carrier member to said base member in articulating fashion.

* * * * *